US012764283B2

(12) United States Patent
Wang et al.

(10) Patent No.: US 12,764,283 B2
(45) Date of Patent: Oct. 13, 2026

(54) FILTERING METHOD, FILTERING MODEL TRAINING METHOD, AND RELATED APPARATUS

(71) Applicant: HUAWEI TECHNOLOGIES CO., LTD., Shenzhen (CN)

(72) Inventors: Shen Wang, Shanghai (CN); Huanbang Chen, Shenzhen (CN); Haitao Yang, Shenzhen (CN); Li Song, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/962,804

(22) Filed: Nov. 27, 2024

(65) Prior Publication Data

US 2025/0097418 A1 Mar. 20, 2025

Related U.S. Application Data

(63) Continuation of application No. PCT/CN2023/094769, filed on May 17, 2023.

(30) Foreign Application Priority Data

May 31, 2022 (CN) ......................... 202210616061.5

(51) Int. Cl.
*H04N 19/117* (2014.01)
*H04N 19/176* (2014.01)
*H04N 19/82* (2014.01)

(52) U.S. Cl.
CPC ......... *H04N 19/117* (2014.11); *H04N 19/176* (2014.11); *H04N 19/82* (2014.11)

(58) Field of Classification Search
CPC .... H04N 19/117; H04N 19/176; H04N 19/82; H04N 19/124; H04N 19/147; H04N 19/86

(Continued)

(56) References Cited

U.S. PATENT DOCUMENTS

2011/0274158 A1* 11/2011 Fu ........................ H04N 19/134 375/E7.127
2012/0082241 A1* 4/2012 Tsai ....................... H04N 19/82 375/E7.193

(Continued)

FOREIGN PATENT DOCUMENTS

CN 113766249 A 12/2021
WO 2010137322 A1 12/2010

(Continued)

OTHER PUBLICATIONS

Yue Li et al., "AHG11: Convolutional Neural Network-based In-Loop Filter with Adaptive Model Selection", Joint Video Experts Team (JVET) of ITU-T SG 16 WP 3 and ISO/IEC JTC 1/SC 29 21st Meeting, by teleconference,JVET-U0068,6 Jan. 15, 2021,total 5 pages.

(Continued)

*Primary Examiner* — Asmamaw G Tarko
(74) *Attorney, Agent, or Firm* — WOMBLE BOND DICKINSON (US) LLP

(57) ABSTRACT

This application discloses a filtering method, a filtering model training method, and a related apparatus, and belongs to the field of coding technologies. The method includes: determining K groups of filtering models based on a quantization parameter of a target image, determining a reconstructed block corresponding to a current coding block in the target image, determining a target filtering model from the K groups of filtering models, and filtering the reconstructed block based on the target filtering model. A same group of filtering models is applicable to coding blocks with same coding quality, different groups of filtering models are applicable to coding blocks with different coding quality, and different filtering models in a same group of filtering (Continued)

models are applicable to coding blocks with different content.

19 Claims, 7 Drawing Sheets

(58) Field of Classification Search
USPC ........................................................ 375/240.02
See application file for complete search history.

(56) References Cited

U.S. PATENT DOCUMENTS

| | | | | |
|---|---|---|---|---|
| 2012/0087595 | A1 | 4/2012 | Minezawa et al. | |
| 2021/0266604 | A1 | 8/2021 | Du et al. | |
| 2022/0159249 | A1* | 5/2022 | Taquet | H04N 19/46 |
| 2023/0239516 | A1* | 7/2023 | Mao | H04N 19/30 375/240.12 |
| 2024/0048775 | A1* | 2/2024 | Li | G06N 3/04 |

FOREIGN PATENT DOCUMENTS

| | | | |
|---|---|---|---|
| WO | 2010146771 | A1 | 12/2010 |
| WO | 2011140960 | A1 | 11/2011 |

OTHER PUBLICATIONS

"White paper on Essential Video Coding (EVC)", ISO/IEC JTC 1/SC 29/AG 3, Dec. 15, 2021 (Dec. 15, 2021), XP030302445, total 17 pages.

Chia-Yang Tsai et al: "AHG6: Baseline options for ALF", Joint Collaborative Team on Video Coding (JCT-VC) of ITU-T SG 16 WP 3 and ISO/IEC JTC 1/SC 29/WG 11, JCTVC-10157, Apr. 16, 2012 (Apr. 16, 2012), total 29 pages.

ITU-T H.264, Series H: Audiovisual and Multimedia Systems Infrastructure of audiovisual services—Coding of moving video, Aug. 2021, 844 pages total—Relevant information is contained in Section 8.7 "Deblocking filter process", pages numbered 198-209 in the document (pp. 220-231 of the PDF document).

* cited by examiner

FILTERING METHOD, FILTERING MODEL TRAINING METHOD, AND RELATED APPARATUS

CROSS-REFERENCE TO RELATED APPLICATIONS

This application is a continuation of International Application No. PCT/CN2023/094769, filed on May 17, 2023, which claims priority to Chinese Patent Application No. 202210616061.5, filed on May 31, 2022. The disclosures of the aforementioned applications are hereby incorporated by reference in their entireties.

TECHNICAL FIELD

This application relates to the field of coding technologies, and in particular, to a filtering method, a filtering model training method, and a related apparatus.

BACKGROUND

A coding technology is widely applied to fields such as multimedia services, broadcast, video communication, and storage. In an encoding process, an image is divided into a plurality of non-overlapping coding blocks, and the plurality of coding blocks are sequentially encoded. In a decoding process, reconstructed blocks are sequentially parsed out from a bitstream, to determine a reconstructed image. However, in some cases, there may be a problem of excessive non-smoothness or inconsecutive pixels between adjacent reconstructed blocks, resulting in image distortion between the reconstructed image and an original image. Therefore, the reconstructed blocks need to be filtered. In addition, when an encoder side encodes the coding block in an intra prediction mode or an inter prediction mode, to ensure encoding quality of a subsequent coding block, the encoder side also needs to filter the reconstructed block.

In a related technology, a filtering model is trained for each quantization parameter in a plurality of quantization parameters in advance. When filtering the reconstructed block, the encoder side selects, from filtering models that are trained in advance, filtering models corresponding to a plurality of quantization parameters adjacent to a quantization parameter of the image, to obtain a plurality of filtering models. Then, a target filtering model is selected from the plurality of filtering models, and the reconstructed block is filtered based on the target filtering model. In addition, the encoder side may further encode an index of the target filtering model into a bitstream, and send the bitstream to a decoder side. After the decoder side receives the bitstream sent by the encoder side, the reconstructed block and the index of the target filtering model can be determined by parsing the bitstream, and then, the reconstructed block is filtered by using the target filtering model based on the index of the target filtering model.

One quantization parameter corresponds to one filtering model, but different filtering may be required for coding blocks with different content in a same image. Therefore, to meet filtering effect of each coding block in the same image, a network structure of a filtering model corresponding to each quantization parameter is complex. As a result, a filtering speed in the foregoing method is affected, and a coding speed of the image may be affected.

SUMMARY

Embodiments of this application provide a filtering method, a filtering model training method, and a related apparatus, to improve filtering performance on the basis of simplifying a network model, and meet filtering effect of coding blocks with different quality and different content in a same image. The technical solutions are as follows.

According to a first aspect, a filtering method is provided, and is applied to an encoder side. In the method, K groups of filtering models are determined based on a quantization parameter of a target image, where each group of the K groups of filtering models includes M filtering models, a same group of filtering models corresponds to a same quantization parameter, different groups of filtering models correspond to different quantization parameters, and both K and M are integers greater than 1; a reconstructed block corresponding to a current coding block in the target image is determined; a target filtering model is determined from the K groups of filtering models, where the target filtering model is a filtering model corresponding to smallest encoding distortion existing after the reconstructed block is filtered, and the encoding distortion existing after the reconstructed block is filtered based on the target filtering model is less than encoding distortion of the reconstructed block; and the reconstructed block is filtered based on the target filtering model.

In an embodiment, the encoder side obtains K reference quantization parameters from a target correspondence based on the quantization parameter of the target image. Because one quantization parameter corresponds to one group of filtering models, the encoder side can determine the K groups of filtering models based on the K reference quantization parameters.

The target correspondence indicates a correspondence between an image quantization parameter and a reference quantization parameter. In an example, the target correspondence is a correspondence between a quantization parameter range and a reference quantization parameter, or the target correspondence is a correspondence between an image quantization parameter and a reference quantization parameter.

When the target correspondence is the correspondence between the quantization parameter range and the reference quantization parameter, because reference quantization parameters corresponding to all quantization parameters in a same quantization parameter range are the same, the encoder side only needs to store the quantization parameter range, and does not need to store all the quantization parameters in sequence. This helps save storage space of the encoder side, and improves efficiency of determining the K groups of filtering models by the encoder side.

When the target correspondence is the correspondence between the image quantization parameter and the reference quantization parameter, because one image quantization parameter corresponds to the K reference quantization parameters, and a correlation between the K reference quantization parameters and the image quantization parameter is stronger, a correlation between the quantization parameter of the target image and the K groups of filtering models determined by the encoder side based on the target correspondence is stronger. This can further improve filtering effect.

Coding quality of a coding block is determined based on a quantization parameter corresponding to the coding block, that is, a smaller quantization parameter indicates higher coding quality, and a larger quantization parameter indicates lower coding quality. In addition, a same group of filtering models corresponds to a same quantization parameter, and different groups of filtering models correspond to different quantization parameters. Therefore, coding quality of a plurality of coding blocks encoded based on a same quantization parameter is the same, and the plurality of coding blocks with the same coding quality can be filtered based on a same group of filtering models. Coding quality of a plurality of coding blocks encoded based on different quantization parameters is different, and the plurality of coding blocks with different coding quality can be filtered based on different groups of filtering models. That is, a same group of filtering models is applicable to coding blocks with same coding quality, and different groups of filtering models are applicable to coding blocks with different coding quality.

In an embodiment, after the K groups of filtering models are determined based on the quantization parameter of the target image, the encoder side further needs to encode, into a bitstream, the quantization parameters corresponding to the K groups of filtering models.

In an embodiment, the encoder side determines, based on the current coding block, the reconstructed block, and the K groups of filtering models, filtering indication information corresponding to the reconstructed block, where the filtering indication information indicates whether the reconstructed block needs to be filtered. When the filtering indication information indicates that the reconstructed block needs to be filtered, the target filtering model is determined from the K groups of filtering models.

The encoder side inputs the reconstructed block into each of the K groups of filtering models, to obtain K*M filter blocks, and determines, based on the current coding block, the reconstructed block, and the K*M filter blocks, a rate-distortion cost corresponding to the reconstructed block and a rate-distortion cost corresponding to each filter block; and if the rate-distortion cost corresponding to the reconstructed block is not less than the rate-distortion cost corresponding to each filter block, determines that the filtering indication information is first indication information, where the first indication information indicates that the reconstructed block needs to be filtered; or if the rate-distortion cost corresponding to the reconstructed block is less than the rate-distortion cost corresponding to each filter block, determines that the filtering indication information is second indication information, where the second indication information indicates that the reconstructed block does not need to be filtered.

The rate-distortion cost indicates a degree of image distortion between the reconstructed block and an original coding block and a degree of image distortion between the filter block and the original coding block. If the rate-distortion cost corresponding to the reconstructed block is less than the rate-distortion cost corresponding to each filter block, it indicates that the image distortion between the reconstructed block and the original coding block is smallest. In this way, image distortion between an original image and a reconstructed image restored based on the reconstructed block is smallest. In this case, the reconstructed block does not need to be filtered. If the rate-distortion cost corresponding to the reconstructed block is not less than the rate-distortion cost corresponding to each filter block, it indicates that the image distortion between the filter block and the original coding block is smallest. In this way, image distortion between an original image and a reconstructed image restored based on the filter block is smallest. In this case, the reconstructed block needs to be filtered.

Based on the foregoing descriptions, an example in which the rate-distortion cost indicates encoding distortion is used. When the filtering indication information indicates that the reconstructed block needs to be filtered, rate-distortion costs corresponding to all the filter blocks are compared with each other, and a filtering model corresponding to a filter block with a smallest rate-distortion cost is determined as the target filtering model. Certainly, in actual application, encoding distortion can be further indicated by another parameter. This is not limited in embodiments of this application.

In an embodiment, after determining, based on the current coding block, the reconstructed block, and the K groups of filtering models, the filtering indication information corresponding to the reconstructed block, the encoder side further needs to encode the filtering indication information into the bitstream.

In an embodiment, after determining the target filtering model from the K groups of filtering models, the encoder side further needs to encode a target index into the bitstream, where the target index indicates the target filtering model.

It should be noted that, the foregoing content is based on an example in which the filtering indication information indicates that the reconstructed block needs to be filtered. Certainly, in actual application, the filtering indication information may alternatively indicate that the reconstructed block does not need to be filtered. When the filtering indication information indicates that the reconstructed block does not need to be filtered, the reconstructed block is not filtered.

Because a same group of filtering models is applicable to coding blocks with same coding quality, different groups of filtering models are applicable to coding blocks with different coding quality, and different filtering models in a same group of filtering models are applicable to coding blocks with different content. In this way, after the K groups of filtering models are determined based on the quantization parameter of the target image, for the reconstructed block corresponding to the current coding block, the target filtering model can be selected from the K groups of filtering models with reference to coding quality and content of the coding block, and then, the reconstructed block is filtered based on the target filtering model, to reduce encoding distortion and improve filtering performance. In addition, for coding blocks with different coding quality and different content in a same image, the filtering performance can be improved on the basis of simplifying a network model, and filtering effect of the coding blocks with different quality and different content in the same image can be met.

According to a second aspect, a filtering method is provided, and is applied to a decoder side. In the method, K groups of filtering models are determined, where each group of the K groups of filtering models includes M filtering models, a same group of filtering models corresponds to a same quantization parameter, different groups of filtering models correspond to different quantization parameters, and both K and M are integers greater than 1; a reconstructed block is determined based on a bitstream; a target filtering model in the K groups of filtering models is determined; and the reconstructed block is filtered based on the target filtering model.

In an embodiment, the decoder side determines the K groups of filtering models based on a quantization parameter of a target image to which the reconstructed block belongs.

In an embodiment, after determining the K groups of filtering models based on the quantization parameter of the target image, an encoder side further encodes, into a bitstream, quantization parameters corresponding to the K groups of filtering models. Therefore, after receiving the bitstream, the decoder side can parse out, from the bitstream, the quantization parameters corresponding to the K groups of filtering models, and determine the K groups of filtering models based on the quantization parameters corresponding to the K groups of filtering model.

The decoder side determines filtering indication information of the reconstructed block, where the filtering indication information indicates whether the reconstructed block needs to be filtered. When the filtering indication information indicates that the reconstructed block needs to be filtered, the target filtering model in the K groups of filtering models is determined.

After determining, based on a current coding block, the reconstructed block, and the K groups of filtering models, the filtering indication information corresponding to the reconstructed block, the encoder side further encodes the filtering indication information into the bitstream. Therefore, after receiving the bitstream, the decoder side can parse out the filtering indication information from the bitstream, and determine, based on the filtering indication information, whether the reconstructed block needs to be filtered. When the filtering indication information indicates that the reconstructed block needs to be filtered, the decoder side can parse out a target index from the bitstream, and then determine the target filtering model based on the target index.

Because a same group of filtering models is applicable to coding blocks with same coding quality, different groups of filtering models are applicable to coding blocks with different coding quality, and different filtering models in a same group of filtering models are applicable to coding blocks with different content. In this way, after the K groups of filtering models are determined based on the quantization parameter of the target image, for the reconstructed block corresponding to the current coding block, the target filtering model can be selected from the K groups of filtering models with reference to coding quality and content of the coding block, and then, the reconstructed block is filtered based on the target filtering model, to reduce encoding distortion and improve filtering performance. In addition, for coding blocks with different coding quality and different content in a same image, the filtering performance can be improved on the basis of simplifying a network model, and filtering effect of the coding blocks with different quality and different content in the same image can be met.

According to a third aspect, a filtering model training method is provided. In the method, a training sample set is obtained, where the training sample set includes a plurality of sample coding blocks and a reconstructed block corresponding to each sample coding block, and quantization parameters of one or more images to which the plurality of sample coding blocks belong are a same quantization parameter; a to-be-trained filtering model is trained based on the training sample set, to obtain an initial filtering model; the training sample set is divided into M initial sample subsets, where each initial sample subset includes at least two sample coding blocks and reconstructed blocks corresponding to the at least two sample coding blocks; the initial filtering model is separately trained based on the M initial sample subsets, to obtain M optimized filtering models; and the M optimized filtering models are trained based on the training sample set, to obtain one group of filtering models.

The plurality of sample coding blocks are obtained by dividing a plurality of sample images, or the plurality of sample coding blocks are obtained by dividing one sample image. In other words, the plurality of sample coding blocks may be from a same sample image, or may be from different sample images, provided that the quantization parameters of the one or more images to which the plurality of sample coding blocks belong are the same. Because the plurality of sample coding blocks are obtained by dividing the image into a plurality of non-overlapping coding blocks, content of the plurality of sample coding blocks is different.

The reconstructed blocks corresponding to the plurality of sample coding blocks are input into the initial filtering model, to obtain a filter block corresponding to each sample coding block, a peak signal to noise ratio of the filter block corresponding to each sample coding block is determined based on the plurality of sample coding blocks and the filter block corresponding to each sample coding block, the plurality of sample coding blocks are ranked in an order of peak signal to noise ratios, and the training sample set is divided into the M initial sample subsets based on a ranking result, where sample coding blocks included in each initial sample subset are at least two consecutive sample coding blocks in the ranking result.

The M optimized filtering models are trained based on the training sample set in a cyclic iteration manner. The $i^{th}$ iteration processing in the cyclic iteration manner includes the following operations.

(1) Divide the training sample set into M optimized sample subsets based on the plurality of sample coding blocks and the reconstructed block corresponding to each sample coding block, where the M optimized sample subsets one-to-one correspond to M filtering models in the $i^{th}$ iteration processing, and M filtering models in the $1^{st}$ iteration processing are the M optimized filtering models.

Reconstructed blocks corresponding to the plurality of sample coding blocks are input into the M filtering models in the $i^{th}$ iteration processing, to obtain M filter blocks corresponding to each sample coding block; peak signal to noise ratios of the M filter blocks corresponding to each sample coding block are determined based on the plurality of sample coding blocks and the M filter blocks corresponding to each sample coding block; and the training sample set is divided into the M optimized sample subsets based on the peak signal to noise ratios of the M filter blocks corresponding to each sample coding block, where each sample coding block is located in an optimized sample subset of a filtering model corresponding to a filter block with a largest peak signal to noise ratio in the M filter blocks corresponding to the sample coding block.

(2) Train the M filtering models in the $i^{th}$ iteration processing based on the M optimized sample subsets.

(3) If i is less than an iteration quantity threshold, use M filtering models, obtained through training, in the $i^{th}$ iteration processing as M filtering models in the $(i+1)^{th}$ iteration processing, and perform the $(i+1)^{th}$ iteration processing.

(4) If i is greater than or equal to an iteration quantity threshold, determine M filtering models, obtained through training, in the $i^{th}$ iteration processing as one group of filtering models.

In this application, the M optimized filtering models are trained in the cyclic iteration manner. When an iteration quantity i of the M filtering models is less than the iteration quantity threshold, it indicates that the optimized filtering model obtained through current training is unreliable. In this case, the M filtering models, obtained through training, in the $i^{th}$ iteration processing are used as the M filtering models in the $(i+1)^{th}$ iteration processing, and the $(i+1)^{th}$ iteration processing continues to be performed. When the iteration quantity i of the M filtering models is greater than or equal to the iteration quantity threshold, it indicates that the optimized filtering model obtained through current training is reliable. In this case, the iteration processing is stopped, and the M filtering models, obtained through training, in the $i^{th}$ iteration processing are used as the one group of filtering models.

The iteration quantity threshold is preset. The iteration quantity threshold is a specified iteration quantity or a largest iteration quantity, and can be set based on different requirements. This is not limited in embodiments of this application.

It should be noted that, in a process of dividing the training sample set into the M optimized sample subsets based on the peak signal to noise ratios of the M filter blocks corresponding to each sample coding block, the training sample set may be divided into only one optimized sample subset. In other words, the largest peak signal to noise ratio in the peak signal to noise ratios of the M filter blocks corresponding to each sample coding block in the training sample set corresponds to a same filtering model. In this case, based on the one optimized sample subset obtained through division, the filtering model in the $i^{th}$ iteration processing is trained, and iteration processing on another filtering model is stopped.

In this application, because the quantization parameters of the one or more images to which the plurality of sample coding blocks included in the training sample set belong are a same quantization parameter, an untrained filtering model is trained based on the training sample set, and the one group of filtering models obtained through training is applicable to coding blocks with same coding quality. In addition, because the content of the plurality of sample coding blocks included in the training sample set is different, the M filtering models included in the group of filtering models are applicable to coding blocks with different content.

According to a fourth aspect, a filtering apparatus is provided. The filtering apparatus has a function of implementing behavior in the filtering method in the first aspect. The filtering apparatus includes at least one module. The at least one module is configured to implement the filtering method provided in the first aspect.

According to a fifth aspect, a filtering apparatus is provided. The filtering apparatus has a function of implementing behavior in the filtering method in the second aspect. The filtering apparatus includes at least one module. The at least one module is configured to implement the filtering method provided in the second aspect.

According to a sixth aspect, a filtering model training apparatus is provided. The filtering model training apparatus has a function of implementing behavior in the filtering model training method in the third aspect. The filtering model training apparatus includes at least one module. The at least one module is configured to implement the filtering model training method provided in the third aspect.

According to a seventh aspect, an encoder side device is provided. The encoder side device includes a processor and a memory, and the memory is configured to store a computer program for performing the filtering method provided in the first aspect. The processor is configured to execute the computer program stored in the memory, to implement the filtering method in the first aspect.

In an embodiment, the encoder side device may further include a communication bus. The communication bus is configured to establish a connection between the processor and the memory.

According to an eighth aspect, a decoder side device is provided. The decoder side device includes a processor and a memory, and the memory is configured to store a computer program for performing the filtering method provided in the second aspect. The processor is configured to execute the computer program stored in the memory, to implement the filtering method in the second aspect.

In an embodiment, the decoder side device may further include a communication bus. The communication bus is configured to establish a connection between the processor and the memory.

According to a ninth aspect, a filtering model training device is provided. The filtering model training device includes a processor and a memory, and the memory is configured to store a computer program for performing the filtering model training method provided in the third aspect. The processor is configured to execute the computer program stored in the memory, to implement the filtering model training method in the third aspect.

In an embodiment, the filtering model training device may further include a communication bus. The communication bus is configured to establish a connection between the processor and the memory.

According to a tenth aspect, a computer-readable storage medium is provided. The storage medium stores instructions, and when the instructions are run on a computer, the computer is enabled to perform operations of the filtering method in the first aspect, operations of the filtering method in the second aspect, or operations of the filtering model training method in the third aspect.

According to an eleventh aspect, a computer program product including instructions is provided. When the instructions are run on a computer, the computer is enabled to perform operations of the filtering method in the first aspect, operations of the filtering method in the second aspect, or operations of the filtering model training method in the third aspect. In other words, a computer program is provided. When the computer program is run on the computer, the computer is enabled to perform operations of the filtering method in the first aspect, operations of the filtering method in the second aspect, or operations of the filtering model training method in the third aspect.

Technical effect obtained in the fourth aspect to the eleventh aspect is similar to technical effect obtained through corresponding technical means in the first aspect, the second aspect, or the third aspect. Details are not described herein again.

DETAILED DESCRIPTION

Figure 1:
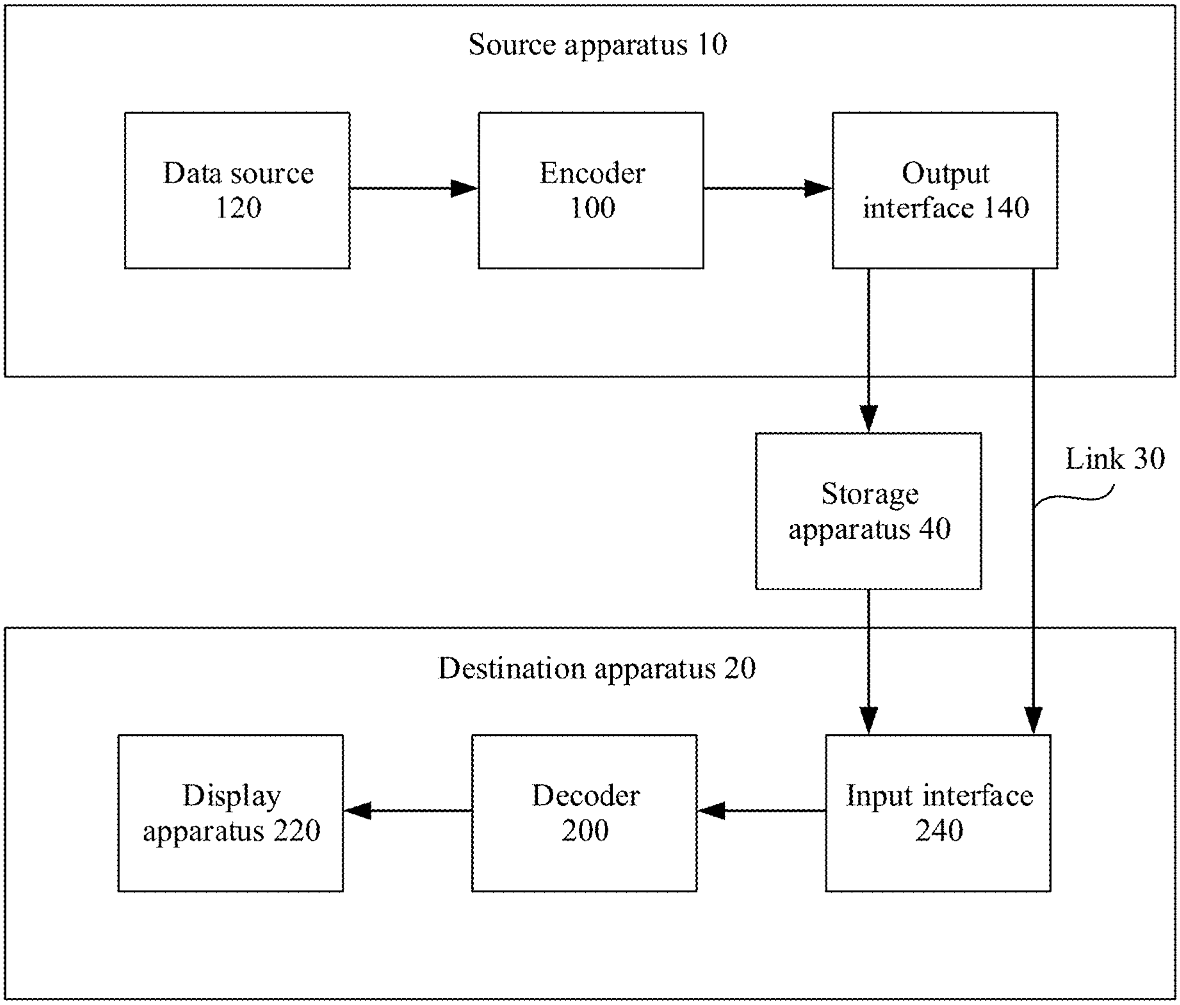
FIG. 1 is a diagram of an implementation environment according to an embodiment of this application.

To make objectives, technical solutions, and advantages of this application clearer, the following further describes embodiments of this application in detail with reference to accompanying drawings.

Before a filtering method provided in embodiments of this application is described in detail, terms and implementation environments in embodiments of this application are first described.

For ease of understanding, the terms in embodiments of this application are first described.

Encoding: The encoding is a processing process of compressing a to-be-encoded image into a bitstream. The image is a static image, a dynamic image, or any video frame included in a video.

Decoding: The decoding is a processing process of restoring an encoded bitstream to a reconstructed image according to a specific syntax rule and processing method.

Coding block: The coding block is a coding area obtained by dividing a to-be-coded image. One image may be divided into a plurality of coding blocks, and the plurality of coding blocks jointly form the image. Each coding block can be independently coded, for example, a size of the coding block is 128*128.

Quantization: The quantization is a process of mapping consecutive values of a signal into a plurality of discrete amplitudes. The quantization can effectively reduce a value range of the signal, to obtain better compression effect, and quantization is a root cause of distortion.

Quantization parameter (QP): The quantization parameter is an important parameter for controlling a quantization degree, and reflects an image compression status. Generally, a smaller QP indicates finer quantization, more retained image details, and higher encoding quality. Therefore, a higher encoding bitrate is needed. A larger QP indicates coarser quantization, more serious loss of image details, lower encoding quality, and more obvious distortion. Therefore, a lower encoding bitrate is needed. That is, the quantization parameter is negatively correlated to an encoding bitrate.

Intra prediction: The intra prediction is to predict a current coding block based on a reconstructed block corresponding to an encoded coding block, in a same image of the current coding block, located before the current coding block. For example, the current coding block is predicted based on a reconstructed block corresponding to an encoded coding block on the left of the current coding block and a reconstructed block corresponding to an encoded coding block above the current coding block.

Inter prediction: The inter prediction is to determine a reconstructed image corresponding to an encoded image located before a current image as a reference image, and predict a current coding block based on a reconstructed block that is in the reference image and that is similar to the current coding block.

The following describes the implementation environments in embodiments of this application.

A coding technology is widely applied to fields such as multimedia services, broadcast, video communication, and storage. In an encoding process, an image is divided into a plurality of non-overlapping coding blocks, and the plurality of coding blocks are sequentially encoded. In a decoding process, reconstructed blocks are sequentially parsed out from a bitstream, to determine a reconstructed image. However, in some cases, there may be a problem of excessive non-smoothness or inconsecutive pixels between adjacent reconstructed blocks, resulting in image distortion between the reconstructed image and an original image. Therefore, the reconstructed blocks need to be filtered. In addition, when an encoder side encodes the coding block in an intra prediction mode or an inter prediction mode, to ensure encoding quality of a subsequent coding block, the encoder side also needs to filter the reconstructed block.

FIG. 1 is a diagram of an implementation environment according to an embodiment of this application. The implementation environment includes a source apparatus 10, a destination apparatus 20, a link 30, and a storage apparatus 40. The source apparatus 10 is configured to encode each coding block in an image; and in a process of performing encoding in an intra prediction mode or an inter prediction mode, is further configured to filter a reconstructed block corresponding to the coding block. The destination apparatus 20 is configured to parse a bitstream to determine a reconstructed block, and is further configured to filter the reconstructed block.

The source apparatus 10 is configured to encode the image to generate a bitstream. Therefore, the source apparatus 10 is also referred to as an image encoding apparatus or an image encoder side. The destination apparatus 20 is configured to decode the bitstream generated by the source apparatus 10. Therefore, the destination apparatus 20 is also referred to as an image decoding apparatus or an image decoder side.

The link 30 is configured to: receive the bitstream generated by the source apparatus 10, and transmit the bitstream to the destination apparatus 20. The storage apparatus 40 is configured to: receive the bitstream generated by the source apparatus 10, and store the bitstream. In this case, the destination apparatus 20 can directly obtain the bitstream from the storage apparatus 40. Alternatively, the storage apparatus 40 corresponds to a file server or another intermediate storage apparatus that can store the bitstream generated by the source apparatus 10. In this case, the destination apparatus 20 can transmit in a streaming manner, or download the bitstream stored on the storage apparatus 40.

The source apparatus 10 and the destination apparatus 20 each include one or more processors and a memory coupled to the one or more processors. The memory includes a random access memory (RAM), a read-only memory (ROM), an electrically erasable programmable read-only memory (EEPROM), a flash memory, any other medium that can be used to store required program code in a form of instructions or data structures and that is accessible to a computer, or the like. For example, the source apparatus 10 and the destination apparatus 20 each include a desktop computer, a mobile computing apparatus, a notebook (for example, laptop) computer, a tablet computer, a set-top box, a handheld telephone set like a so-called "smartphone", a television set, a camera, a display apparatus, a digital media player, a video game console, or a vehicle-mounted computer.

The link 30 includes one or more media or apparatuses that can transmit the bitstream from the source apparatus 10 to the destination apparatus 20. In an embodiment, the link 30 includes one or more communication media that can enable the source apparatus 10 to directly send the bitstream to the destination apparatus 20 in real time. In this embodiment of this application, the source apparatus 10 modulates the bitstream according to a communication standard, where the communication standard is a wireless communication protocol or the like, and sends the bitstream to the destination apparatus 20. The one or more communication media includes a wireless communication medium and/or a wired communication medium. For example, the one or more communication media includes a radio frequency (RF) spectrum or one or more physical transmission lines. The one or more communication media can be a part of a packet-based network. The packet-based network is a local area network, a wide area network, a global network (for example, the Internet), or the like. The one or more communication media includes a router, a switch, a base station, another device that facilitates communication from the source apparatus 10 to the destination apparatus 20, or the like. This is not limited in embodiments of this application.

In an embodiment, the storage apparatus 40 is configured to store the received bitstream sent by the source apparatus 10, and the destination apparatus 20 can directly obtain the bitstream from the storage apparatus 40. In this case, the storage apparatus 40 includes any one of a plurality of distributed or locally accessed data storage media. For example, the any one of a plurality of distributed or locally accessed data storage media is a hard disk drive, a Blu-ray disc, a digital versatile disc (DVD), a compact disc read-only memory (CD-ROM), a flash memory, a volatile or non-volatile memory, or any other appropriate digital storage medium configured to store the bitstream.

In an embodiment, the storage apparatus 40 corresponds to a file server or another intermediate storage apparatus that can store the bitstream generated by the source apparatus 10, and the destination apparatus 20 may transmit in a streaming manner, or download the image stored on the storage apparatus 40. The file server is any type of server that can store the bitstream and send the bitstream to the destination apparatus 20. In an embodiment, the file server includes a network server, a file transfer protocol (FTP) server, a network attached storage (NAS) apparatus, a local disk drive, or the like. The destination apparatus 20 can obtain the bitstream through any standard data connection (including an Internet connection). The any standard data connection includes a wireless channel (for example, a Wi-Fi connection), a wired connection (for example, a digital subscriber line (DSL) or a cable modem), or a combination of a wireless channel and a wired connection suitable for obtaining the bitstream stored on the file server. Transmission of the bitstream from the storage apparatus 40 may be transmission in a streaming manner, transmission in a download manner, or a combination thereof.

The implementation environment shown in FIG. 1 is merely an embodiment. In addition, technologies in embodiments of this application are not only applicable to the source apparatus 10 that can encode the image and the destination apparatus 20 that decodes the bitstream in FIG. 1, but also applicable to another apparatus that can encode the image and decode the bitstream. This is not limited in embodiments of this application.

In the implementation environment shown in FIG. 1, the source apparatus 10 includes a data source 120, an encoder 100, and an output interface 140. In some embodiments, the output interface 140 includes a modulator/demodulator (modem) and/or a sender. The sender is also referred to as a transmitter. The data source 120 includes an image capture apparatus (for example, a camera), an archive including a previously captured image, a feed-in interface for receiving an image from an image content provider, and/or a computer graphics system for generating an image, or a combination of these sources of images.

The data source 120 is configured to send the image to the encoder 100, and the encoder 100 is configured to encode the received image sent from the data source 120 to obtain the bitstream. The encoder sends the bitstream to the output interface. In some embodiments, the source apparatus 10 directly sends the bitstream to the destination apparatus 20 through the output interface 140. In another embodiment, the bitstream may alternatively be stored on the storage apparatus 40, so that the destination apparatus 20 subsequently obtains the bitstream for decoding and/or display.

In the implementation environment shown in FIG. 1, the destination apparatus 20 includes an input interface 240, a decoder 200, and a display apparatus 220. In some embodiments, the input interface 240 includes a receiver and/or a modem. The input interface 240 may receive the bitstream through the link 30 and/or from the storage apparatus 40, and then send the bitstream to the decoder 200. The decoder 200 is configured to decode the received bitstream to obtain a reconstructed image. The decoder sends the reconstructed image to the display apparatus 220. The display apparatus 220 may be integrated with the destination apparatus 20 or disposed outside the destination apparatus 20. Generally, the display apparatus 220 displays the reconstructed image. The display apparatus 220 is a display apparatus of any one of a plurality of types. For example, the display apparatus 220 is a liquid crystal display (LCD), a plasma display, an organic light-emitting diode (OLED) display, or another type of display apparatus.

Although not shown in FIG. 1, in some aspects, the encoder 100 and the decoder 200 may be respectively integrated with an audio encoder and an audio decoder, and may include an appropriate multiplexer-demultiplexer (MUX-DEMUX) unit or other hardware and software for encoding both an audio and a video in a same data stream or separate data streams. In some embodiments, if applicable, the MUX-DEMUX unit may comply with the ITU H.223 multiplexer protocol or another protocol like the user datagram protocol (UDP).

The encoder 100 and the decoder 200 each may be any one of the following circuits: one or more microprocessors, a digital signal processor (DSP), an application-specific integrated circuit (ASIC), a field-programmable gate array (FPGA), discrete logic, hardware, or any combination thereof. If technologies in embodiments of this application are partially implemented in software, an apparatus may store instructions for the software in an appropriate non-volatile computer-readable storage medium, and may execute the instructions in hardware through one or more processors, to implement the technologies in embodiments of this application. Any one of the foregoing content (including hardware, software, a combination of hardware and software, and the like) may be considered as the one or more processors. Each of the encoder 100 and the decoder 200 may be included in one or more encoders or decoders. Either the encoder or the decoder can be integrated as a part of a combined encoder/decoder (codec) in a corresponding apparatus.

In this embodiment of this application, the encoder 100 may be generally referred to as "signaling" or "sending" some information to another apparatus, for example, the decoder 200. The term "signaling" or "sending" may generally refer to transmission of syntax elements and/or other data used to decode the bitstream. Such transmission may occur in real time or almost in real time. Alternatively, such communication may occur after a period of time, for example, may occur when a syntax element in an encoded bitstream is stored in a computer-readable storage medium during encoding. The decoding apparatus may then retrieve the syntax element at any time after the syntax element is stored in the medium.

Figure 2:
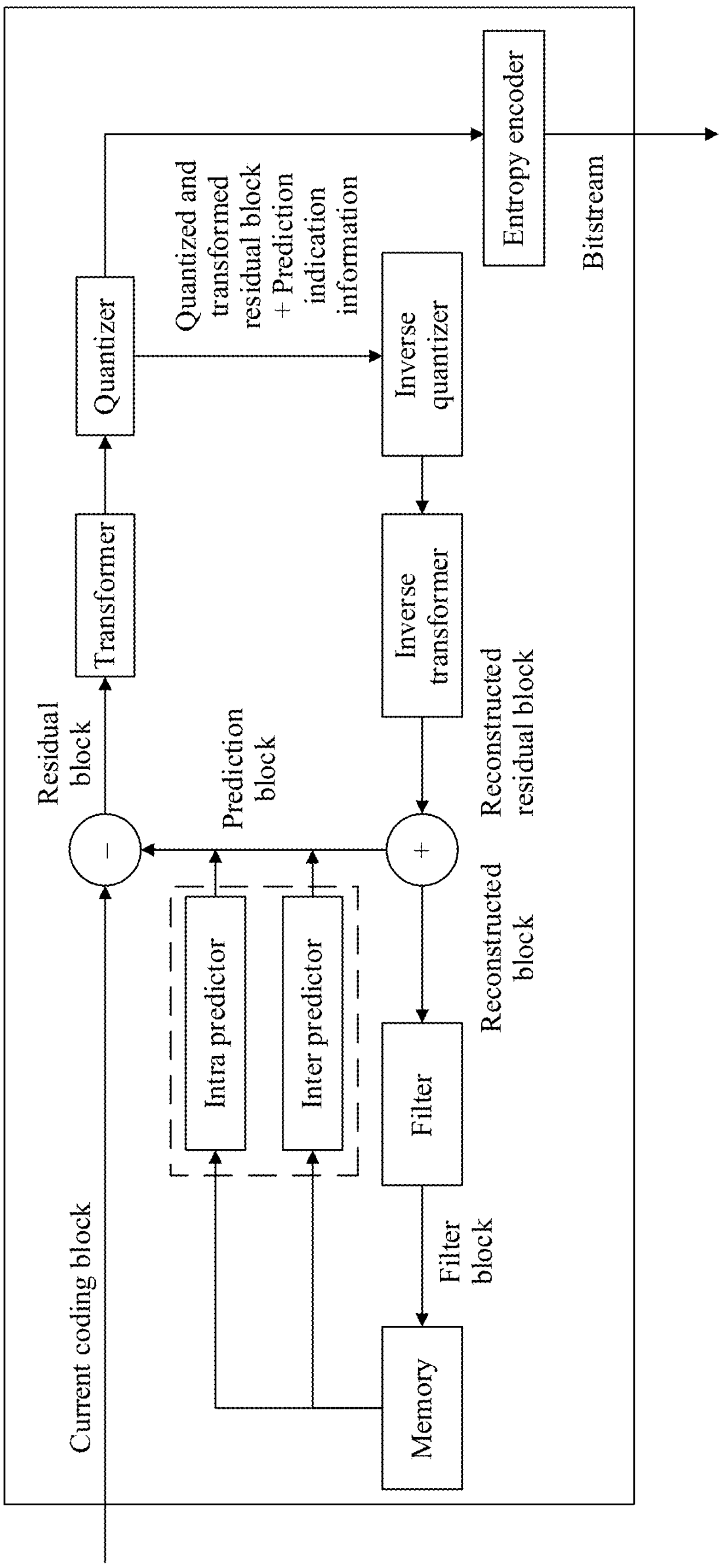
FIG. 2 is an example block diagram of a structure of an encoder side according to an embodiment of this application.

FIG. 2 is an example block diagram of a structure of an encoder side according to an embodiment of this application. The encoder side includes a predictor, a transformer, a quantizer, an entropy encoder, an inverse quantizer, an inverse transformer, a filter, and a memory. The predictor is an intra predictor or an inter predictor. To be specific, for a current coding block in a to-be-encoded target image, the encoder side can perform intra prediction on the current coding block by using the intra predictor, and can further perform inter prediction on the current coding block by using the inter predictor. When performing intra prediction on the current coding block, the encoder side obtains a first reference reconstructed block from the memory, and performs, based on the first reference reconstructed block, intra prediction on the current coding block by using the intra predictor, to obtain a prediction block corresponding to the current coding block, where the first reference reconstructed block is a reconstructed block corresponding to an encoded coding block that is in the target image and that is located before the current coding block. Alternatively, when performing inter prediction on the current coding block, the encoder side obtains a second reference reconstructed block from the memory, and then predicts, based on the second reference reconstructed block, the current coding block by using the inter predictor, to obtain a prediction block corresponding to the current coding block, where the second reference reconstructed block is a reconstructed block that is similar to the current coding block and that is in an encoded image located before the target image.

After determining, by using the intra predictor or the inter predictor according to the foregoing method, the prediction block corresponding to the current coding block, the encoder side determines a difference between the current coding block and the prediction block as a residual block. Then, the residual block is transformed by using the transformer, to obtain a transformed residual block, and the transformed residual block is quantized by using the quantizer, to obtain a quantized and transformed residual block. Finally, the entropy encoder encodes the quantized and transformed residual block and prediction indication information into a bitstream, and sends the bitstream to a decoder side, where the prediction indication information indicates a prediction mode used when the current coding block is predicted.

To ensure coding quality of a next coding block adjacent to the current coding block, before encoding the next coding block, the encoder side further needs to perform inverse quantization on the quantized and transformed residual block by using the inverse quantizer, to obtain the transformed residual block, and then perform inverse transformation on the transformed residual block by using the inverse transformer, to obtain a reconstructed residual block. Then, the reconstructed residual block and the prediction block are added to obtain a reconstructed block corresponding to the current coding block. After determining the reconstructed block corresponding to the current coding block, the encoder side filters, by using the filter according to a filtering method provided in embodiments of this application, the reconstructed block corresponding to the current coding block, to obtain a filter block corresponding to the current coding block, and then stores the filter block corresponding to the current coding block in the memory, to encode the next coding block.

Based on the foregoing descriptions, a QP is an important parameter for controlling a quantization degree. Therefore, in a process of encoding the current coding block by the encoder side, a QP corresponding to the current coding block needs to be determined. In actual application, QPs corresponding to different coding blocks in a same image may be the same or may be different. For example, the encoder side divides the target image into a plurality of non-overlapping coding blocks, and for any one of the plurality of coding blocks, a QP of the target image is used as a QP corresponding to the coding block. For another example, the encoder side divides the target image into a plurality of non-overlapping coding blocks, and for any one of the plurality of coding blocks, a QP of the target image is used as a reference to adaptively adjust a QP of the coding block.

The plurality of coding blocks may be coding blocks of a same size, or may be coding blocks of different sizes. In other words, the encoder side divides the target image into the coding blocks of the same size, or the encoder side divides the target image into the coding blocks of different sizes based on content of the target image. A shape of the coding block is a square, or a shape of the coding block is another shape. The shape of the coding block is not limited in embodiments of this application.

In an embodiment, the transformer is any one of a discrete cosine transform (DCT) device, a discrete sine transform (DST) device, or a K-L transform (karhunen-loève transform, KLT) device.

Figure 3:
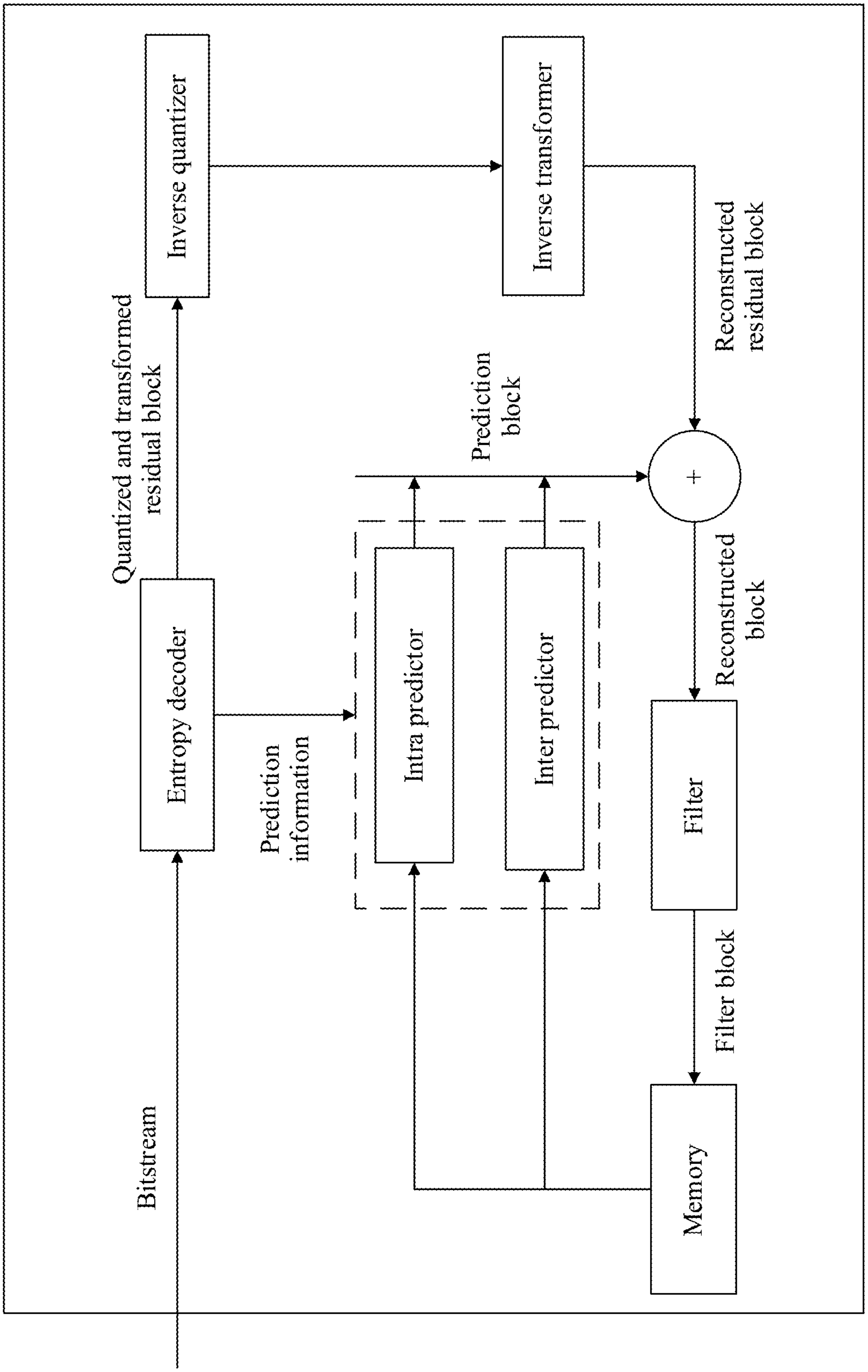
FIG. 3 is an example block diagram of a structure of a decoder side according to an embodiment of this application.

FIG. 3 is an example block diagram of a structure of a decoder side according to an embodiment of this application. The decoder side includes an entropy decoder, a predictor, an inverse quantizer, an inverse transformer, a memory, and a filter. The predictor is an intra predictor or an inter predictor. To be specific, for a target image, when an encoder side performs intra prediction on each coding block in the target image, the decoder side also needs to determine a prediction block by using the intra predictor. When the encoder side performs inter prediction on each coding block in the target image, the decoder side also needs to determine a prediction block by using the inter predictor.

After receiving a bitstream, the decoder side decodes the received bitstream by using the entropy decoder, to obtain a quantized and transformed residual block and prediction indication information, where the prediction indication information indicates a prediction mode used when a current coding block is predicted. Then, the decoder side determines, based on the prediction indication information, a specific predictor (e.g., the intra predictor or the inter predictor) used to perform prediction. When it is determined that prediction is performed by using the intra predictor, the decoder side obtains a first reference reconstructed block from the memory, and determines, by using the intra predictor, a prediction block corresponding to the current coding block. When it is determined that prediction is performed by using the inter predictor, the decoder side obtains a second reference reconstructed block from the memory, and determines, by using the inter predictor, a prediction block corresponding to the current coding block. Then, the quantized and transformed residual block is sequentially processed by using the inverse quantizer and the inverse transformer to obtain a reconstructed residual block, and the reconstructed residual block and the prediction block are added to obtain a reconstructed block corresponding to the current coding block.

To avoid image distortion between the current coding block and the reconstructed block corresponding to the current coding block, and avoid a problem of excessive non-smoothness or inconsecutive pixels between adjacent reconstructed blocks, the decoder side can further filter the reconstructed block by using the filter according to a filtering method provided in embodiments of this application.

It should be noted that service scenarios described in embodiments of this application are intended to describe technical solutions in embodiments of this application more clearly, and do not constitute a limitation on technical solutions provided in embodiments of this application. A person of ordinary skill in the art can know that technical solutions provided in embodiments of this application are also applicable to similar technical problems with emergence of new service scenarios.

The following describes in detail the filtering method provided in embodiments of this application.

Figure 4:
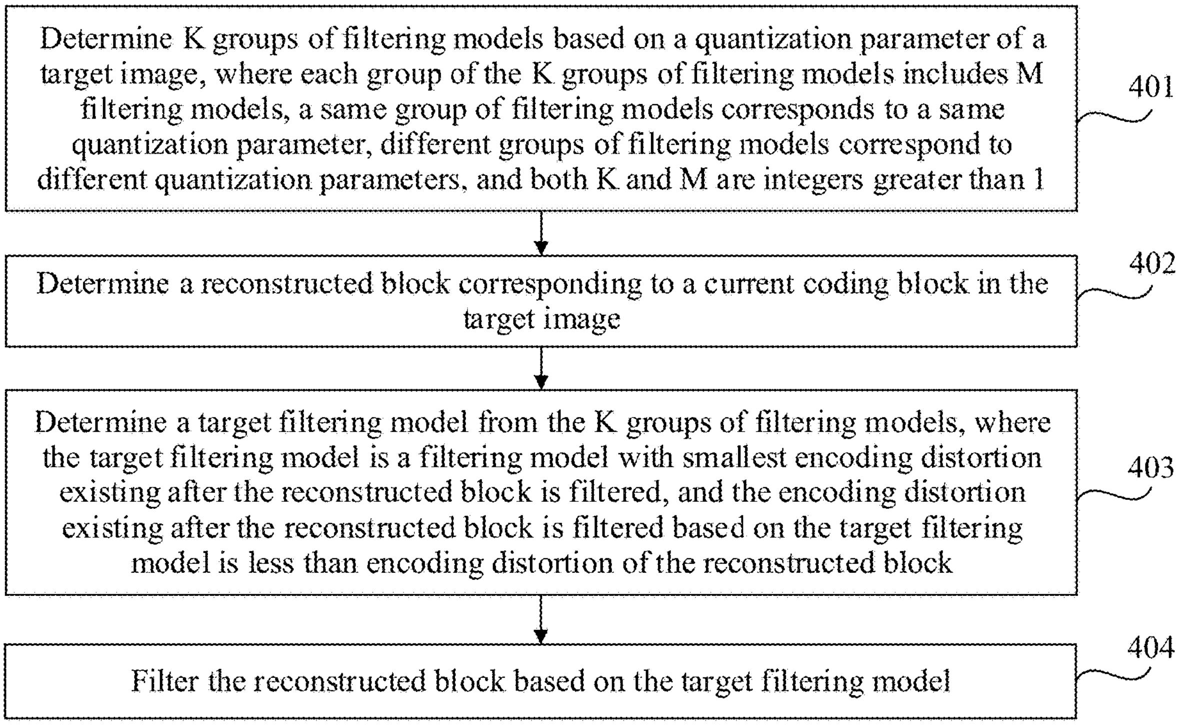
FIG. 4 is a flowchart of a filtering method according to an embodiment of this application.

FIG. 4 is a flowchart of a filtering method according to an embodiment of this application. The method is applied to an encoder side. As shown in FIG. 4, the method includes the following operations.

Operation 401: Determine K groups of filtering models based on a quantization parameter of a target image, where each group of the K groups of filtering models includes M filtering models, a same group of filtering models corresponds to a same quantization parameter, different groups of filtering models correspond to different quantization parameters, and both K and M are integers greater than 1.

In some embodiments, the encoder side obtains K reference quantization parameters from a target correspondence based on the quantization parameter of the target image. Because one quantization parameter corresponds to one group of filtering models, the encoder side can determine the K groups of filtering models based on the K reference quantization parameters.

The target correspondence indicates a correspondence between an image quantization parameter and a reference quantization parameter. In an example, the target correspondence is a correspondence between a quantization parameter range and a reference quantization parameter, or the target correspondence is a correspondence between an image quantization parameter and a reference quantization parameter.

When the target correspondence is the correspondence between the quantization parameter range and the reference quantization parameter, the encoder side first determines a quantization parameter range in which the quantization parameter of the target image falls, to obtain a target quantization parameter range, and then obtains, from the target correspondence based on the target quantization parameter range, the K reference quantization parameters corresponding to the target quantization parameter range.

For example, the target correspondence is shown in Table 1. In Table 1, one quantization parameter range corresponds to three reference quantization parameters. In Table 1, for example, each quantization parameter range corresponds to three reference quantization parameters, that is, quantities of reference quantization parameters corresponding to all quantization parameter ranges are the same. Certainly, in actual application, the quantities of reference quantization parameters corresponding to all the quantization parameter ranges may alternatively be different.

TABLE 1

| Quantization parameter range | Reference quantization parameter |
|---|---|
| QP ≤ 24 | QP = 22, QP = 17, QP = 27 |
| 24 < QP ≤ 29 | QP = 27, QP = 22, QP = 17 |
| 29 < QP ≤ 34 | QP = 32, QP = 27, QP = 22 |
| 34 < QP ≤ 39 | QP = 42, QP = 37, QP = 32 |

When the target correspondence is the correspondence between the image quantization parameter and the reference quantization parameter, the encoder side directly obtains, from the target correspondence based on the quantization parameter of the target image, the K reference quantization parameters corresponding to the quantization parameter of the target image.

For example, the target correspondence is shown in Table 2. In Table 2, one image quantization parameter corresponds to three reference quantization parameters. In Table 2, for example, each image quantization parameter corresponds to three reference quantization parameters, that is, quantities of reference quantization parameters corresponding to all image quantization parameters are the same. Certainly, in actual application, the quantities of reference quantization parameters corresponding to all the image quantization parameters may alternatively be different.

TABLE 2

| Image quantization parameter | Reference quantization parameter |
|---|---|
| QP = 24 | QP = 22, QP = 17, QP = 27 |
| QP = 29 | QP = 27, QP = 22, QP = 17 |
| QP = 34 | QP = 32, QP = 27, QP = 22 |
| QP = 39 | QP = 42, QP = 37, QP = 32 |

When the target correspondence is the correspondence between the quantization parameter range and the reference quantization parameter, because reference quantization parameters corresponding to all quantization parameters in a same quantization parameter range are the same, the encoder side only needs to store the quantization parameter range, and does not need to store all the quantization parameters in sequence. This helps save storage space of the encoder side, and improves efficiency of determining the K groups of filtering models by the encoder side.

When the target correspondence is the correspondence between the image quantization parameter and the reference quantization parameter, because one image quantization parameter corresponds to the K reference quantization parameters, and a correlation between the K reference quantization parameters and the image quantization parameter is stronger, a correlation between the quantization parameter of the target image and the K groups of filtering models determined by the encoder side based on the target correspondence is stronger. This can further improve filtering effect.

Coding quality of a coding block is determined based on a quantization parameter corresponding to the coding block, that is, a smaller quantization parameter indicates higher coding quality, and a larger quantization parameter indicates lower coding quality. In addition, a same group of filtering models corresponds to a same quantization parameter, and different groups of filtering models correspond to different quantization parameters. Therefore, coding quality of a plurality of coding blocks encoded based on a same quantization parameter is the same, and the plurality of coding blocks with the same coding quality can be filtered based on a same group of filtering models. Coding quality of a plurality of coding blocks encoded based on different quantization parameters is different, and the plurality of coding blocks with different coding quality can be filtered based on different groups of filtering models. That is, a same group of filtering models is applicable to coding blocks with same coding quality, and different groups of filtering models are applicable to coding blocks with different coding quality.

In some embodiments, after determining the K groups of filtering models based on the quantization parameter of the target image, the encoder side further needs to encode, into a bitstream, the quantization parameters corresponding to the K groups of filtering models. In this way, after receiving the bitstream, a decoder side can parse out, from the bitstream, the quantization parameters corresponding to the K groups of filtering models, and determine the K groups of filtering models based on the quantization parameters corresponding to the K groups of filtering models.

A structure of the filtering model may be a convolutional neural network (CNN) structure, or may be another structure. The structure of the filtering model is not limited in embodiments of this application.

Operation 402: Determine a reconstructed block corresponding to a current coding block in the target image.

For a process in which the encoder side determines the reconstructed block corresponding to the current coding block in the target image, refer to related descriptions in FIG. 2. Details are not described herein again.

Operation 403: Determine a target filtering model from the K groups of filtering models, where the target filtering model is a filtering model corresponding to smallest encoding distortion existing after the reconstructed block is filtered, and the encoding distortion existing after the reconstructed block is filtered based on the target filtering model is less than encoding distortion of the reconstructed block.

In some embodiments, the encoder side can determine the target filtering model from the K groups of filtering models by performing the following operations (1) and (2).

(1) Determine, based on the current coding block, the reconstructed block, and the K groups of filtering models, filtering indication information corresponding to the reconstructed block, where the filtering indication information indicates whether the reconstructed block needs to be filtered.

The encoder side inputs the reconstructed block into each of the K groups of filtering models, to obtain K*M filter blocks, and determines, based on the current coding block, the reconstructed block, and the K*M filter blocks, a rate-distortion cost corresponding to the reconstructed block and a rate-distortion cost corresponding to each filter block; and if the rate-distortion cost corresponding to the reconstructed block is not less than the rate-distortion cost corresponding to each filter block, determines that the filtering indication information is first indication information, where the first indication information indicates that the reconstructed block needs to be filtered; or if the rate-distortion cost corresponding to the reconstructed block is less than the rate-distortion cost corresponding to each filter block, determines that the filtering indication information is second indication information, where the second indication information indicates that the reconstructed block does not need to be filtered.

In an example, the rate-distortion cost corresponding to the reconstructed block can be determined according to Formula (1):

$$J = D + \lambda R \tag{1}$$

In Formula (1), J indicates the rate-distortion cost, D indicates an error between a pixel value of a pixel in the reconstructed block and a pixel value of a pixel in the current coding block, λ indicates a distortion parameter and is usually a default value, and R indicates a quantity of bits required for encoding the current coding block into the bitstream when the reconstructed block does not need to be filtered. Certainly, in actual application, the rate-distortion cost corresponding to each filter block may also be determined according to Formula (1). In this case, in Formula (1), D indicates an error between a pixel value of a pixel in the filter block and a pixel value of a pixel in the current coding block, and R indicates a quantity of bits required for encoding the current coding block into the bitstream when the reconstructed block needs to be filtered.

When the reconstructed block does not need to be filtered, the quantity of bits required for encoding the current coding block into the bitstream includes a quantity of bits required for encoding the filtering indication information, a quantity of bits required for encoding a quantized and transformed residual block, and a quantity of bits required for encoding prediction indication information. When the reconstructed block needs to be filtered, the quantity of bits required for encoding the current coding block into the bitstream includes a quantity of bits required for encoding the filtering indication information, a quantity of bits required for encoding a quantized and transformed residual block, a quantity of bits required for encoding prediction indication information, and a quantity of bits required for encoding a filtering model index.

In some embodiments, the encoder side stores a correspondence between the filtering model index and the quantity of bits required for encoding the filtering model index. Therefore, after determining the K*M filtering models, the encoder side can obtain, based on model indexes of the K*M filtering models and from the stored correspondence between the filtering model index and the quantity of bits required for encoding the filtering model index, a quantity of bits required for encoding the K*M filtering model indexes, and then determine, according to Formula (1), the rate-distortion cost corresponding to each filter block.

The foregoing content is based on an example in which quantities of bits required for encoding different filtering model indexes are different, that is, different filtering model indexes correspond to different quantities of bits for encoding. Certainly, in actual application, quantities of bits required for encoding different filtering model indexes may alternatively be the same, that is, different filtering model indexes correspond to a same quantity of bits for encoding. In this way, when the rate-distortion cost corresponding to each filter block is determined according to Formula (1), a rate-distortion cost corresponding to each of the K*M filter blocks mainly depends on a pixel error between the current coding block and the filter block in the K*M filter blocks.

It should be noted that, when the rate-distortion cost corresponding to the reconstructed block and the rate-distortion cost corresponding to each filter block are determined according to Formula (1), the error between a pixel value of a pixel in the reconstructed block and a pixel value of a pixel in the current coding block, and an error between a pixel value of a pixel in the current coding block and a pixel value of a pixel in each of the K*M filter blocks each are any one of a sum of absolute differences (SAD), a sum of absolute transformed differences (SATD), and a mean squared error (MSE).

The rate-distortion cost indicates a degree of image distortion between the reconstructed block and an original coding block and a degree of image distortion between the filter block and the original coding block. If the rate-distortion cost corresponding to the reconstructed block is less than the rate-distortion cost corresponding to each filter block, it indicates that the image distortion between the reconstructed block and the original coding block is smallest. In this way, image distortion between an original image and a reconstructed image restored based on the reconstructed block is smallest. In this case, the reconstructed block does not need to be filtered. If the rate-distortion cost corresponding to the reconstructed block is not less than the rate-distortion cost corresponding to each filter block, it indicates that the image distortion between the filter block and the original coding block is smallest. In this way, image distortion between an original image and a reconstructed image restored based on the filter block is smallest. In this case, the reconstructed block needs to be filtered.

The first indication information and the second indication information may be in a plurality of forms, for example, a value or a character. When the first indication information and the second indication information are values, the first indication information is 0, and the second indication information is 1. Certainly, values of the first indication information and the second indication information may alternatively be reversed, or may be other values. This is not limited in embodiments of this application.

In some embodiments, after determining, based on the current coding block, the reconstructed block, and the K groups of filtering models, the filtering indication information corresponding to the reconstructed block, the encoder side further needs to encode the filtering indication information into the bitstream. In this way, after receiving the bitstream, the decoder side can determine, based on the bitstream, whether the reconstructed block needs to be filtered.

(2) When the filtering indication information indicates that the reconstructed block needs to be filtered, determine the target filtering model from the K groups of filtering models.

Based on the foregoing descriptions, an example in which the rate-distortion cost indicates encoding distortion is used. When the filtering indication information indicates that the reconstructed block needs to be filtered, rate-distortion costs corresponding to all the filter blocks are compared with each other, and a filtering model corresponding to a filter block with a smallest rate-distortion cost is determined as the target filtering model. Certainly, in actual application, encoding distortion can be further indicated by another parameter. This is not limited in embodiments of this application.

In some embodiments, after determining the target filtering model from the K groups of filtering models, the encoder side further needs to encode a target index into the bitstream, where the target index indicates the target filtering model. In this way, after receiving the bitstream, the decoder side can determine, based on the bitstream, the target filtering model for filtering the reconstructed block.

In an example, to distinguish between different filtering models, each filtering model corresponds to one model index, and different filtering models correspond to different model indexes. In this case, the target index includes a target model index, and the target model index indicates the target filtering model in the K groups of filtering models.

In another example, a same group of filtering models corresponds to a same quantization parameter, and different groups of filtering models correspond to different quantization parameters. Therefore, to distinguish between different filtering models, a same group of filtering models corresponds to a same quality index, and different groups of filtering models correspond to different quality indexes. Different filtering models in a same group of filtering models correspond to different content indexes, and filtering models in different groups may have a same content index. In this case, the target index includes a target quality index and a target content index. The target quality index indicates a group of filtering models to which the target filtering model belongs, and the target content index indicates a model in the group of filtering models that is the target filtering model.

It should be noted that, the foregoing content is based on an example in which the filtering indication information indicates that the reconstructed block needs to be filtered. Certainly, in actual application, the filtering indication information may alternatively indicate that the reconstructed block does not need to be filtered. When the filtering indication information indicates that the reconstructed block does not need to be filtered, the reconstructed block is not filtered.

Operation 404: Filter the reconstructed block based on the target filtering model.

The reconstructed block is input to the target filtering model, and the target filtering model outputs a filter block according to a related algorithm, to filter the reconstructed block.

In this embodiment of this application, each group of filtering models includes the M filtering models, a same group of filtering models corresponds to a same quantization parameter, and different groups of filtering models correspond to different quantization parameters. That is, a same group of filtering models is applicable to coding blocks with same coding quality, different groups of filtering models are applicable to coding blocks with different coding quality, and different filtering models in a same group of filtering models are applicable to coding blocks with different content. In this way, after the K groups of filtering models are determined based on the quantization parameter of the target image, for the reconstructed block corresponding to the current coding block, the target filtering model can be selected from the K groups of filtering models with reference to coding quality and content of the coding block, and then, the reconstructed block is filtered based on the target filtering model, to reduce encoding distortion and improve filtering performance. In addition, for coding blocks with different coding quality and different content in a same image, the filtering performance can be improved on the basis of simplifying a network model, and filtering effect of the coding blocks with different quality and different content in the same image can be met.

Figure 5:
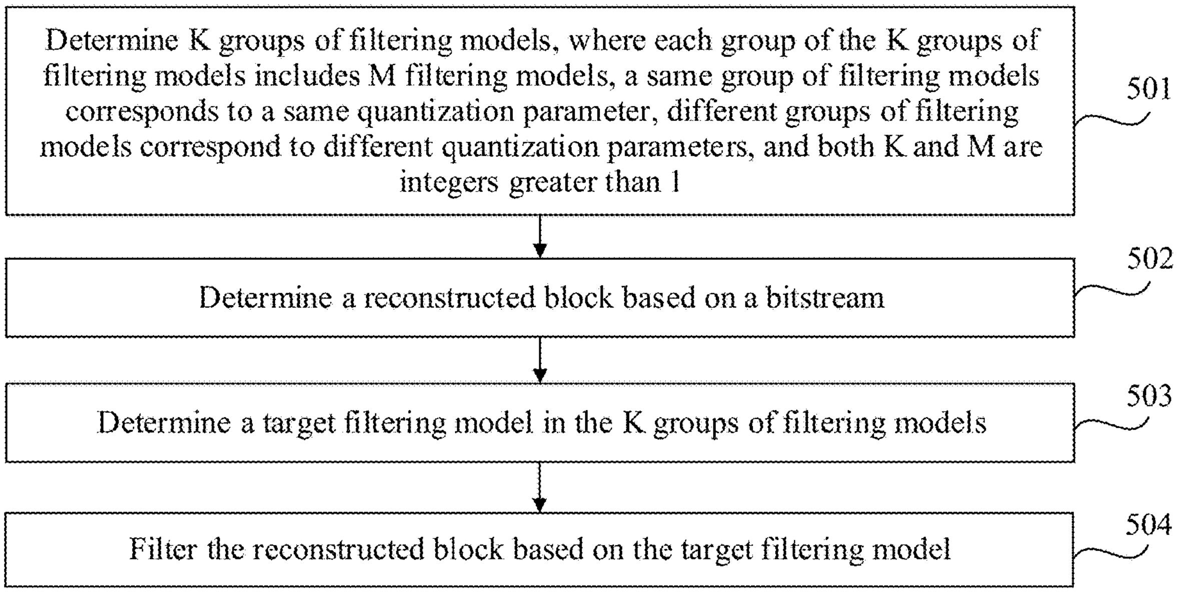
FIG. 5 is a flowchart of another filtering method according to an embodiment of this application.

FIG. 5 is a flowchart of another filtering method according to an embodiment of this application. The method is applied to a decoder side. As shown in FIG. 5, the method includes the following operations.

Operation 501: Determine K groups of filtering models, where each group of the K groups of filtering models includes M filtering models, a same group of filtering models corresponds to a same quantization parameter, different groups of filtering models correspond to different quantization parameters, and both K and M are integers greater than 1.

In some embodiments, the decoder side determines the K groups of filtering models based on a quantization parameter of a target image to which this reconstructed block belongs. For a detailed implementation process, refer to related descriptions of operation 401. Details are not described herein again.

In some other embodiments, after determining the K groups of filtering models based on the quantization parameter of the target image, an encoder side further encodes, into a bitstream, quantization parameters corresponding to the K groups of filtering models. Therefore, after receiving the bitstream, the decoder side can parse out, from the bitstream, the quantization parameters corresponding to the K groups of filtering models, and determine the K groups of filtering models based on the quantization parameters corresponding to the K groups of filtering models.

Operation 502: Determine the reconstructed block based on the bitstream.

After receiving the bitstream, the decoder side parses out, from the bitstream, a reconstructed block corresponding to a current coding block. For a process in which the decoder side parses out, from the bitstream, the reconstructed block corresponding to the current coding block, refer to related descriptions in FIG. 3. Details are not described herein again.

Operation 503: Determine a target filtering model from the K groups of filtering models.

In some embodiments, the decoder side determines filtering indication information of the reconstructed block, where the filtering indication information indicates whether the reconstructed block needs to be filtered. When the filtering indication information indicates that the reconstructed block needs to be filtered, the target filtering model in the K groups of filtering models is determined.

After determining, based on the current coding block, the reconstructed block, and the K groups of filtering models, the filtering indication information corresponding to the reconstructed block, the encoder side further encodes the filtering indication information into the bitstream. Therefore, after receiving the bitstream, the decoder side can parse out the filtering indication information from the bitstream, and determine, based on the filtering indication information, whether the reconstructed block needs to be filtered.

When the filtering indication information indicates that the reconstructed block needs to be filtered, after determining the target filtering model from the K groups of filtering models, the encoder side further encodes, into the bitstream, a target index for indicating the target filtering model. Therefore, the decoder side can further parse out the target index from the bitstream, and then determine the target filtering model based on the target index.

Based on the foregoing descriptions, the target index includes a target model index, or includes a target quality index and a target content index. In different cases, processes in which the decoder side determines the target filtering model based on the target index are different. Therefore, the following separately describes the following two cases.

In a first case, the target index includes the target model index. In this case, the decoder side directly selects a corresponding filtering model from the K groups of filtering models based on the target model index, and determines the selected filtering model as the target filtering model.

In a second case, the target index includes the target quality index and the target content index. In this case, the decoder side first selects a corresponding group of filtering models from the K groups of filtering models based on the target quality index, and then, determines, from the selected group of filtering models based on the target content index, a filtering model corresponding to the target content index, to obtain the target filtering model.

Operation 504: Filter the reconstructed block based on the target filtering model.

The reconstructed block is input to the target filtering model, and the target filtering model outputs a filter block according to a related algorithm, to filter the reconstructed block.

In this embodiment of this application, each group of filtering models includes the M filtering models, a same group of filtering models corresponds to a same quantization parameter, and different groups of filtering models correspond to different quantization parameters. That is, a same group of filtering models is applicable to coding blocks with same coding quality, different groups of filtering models are applicable to coding blocks with different coding quality, and different filtering models in a same group of filtering models are applicable to coding blocks with different content. In this way, after the K groups of filtering models are determined based on the quantization parameter of the target image, for the reconstructed block corresponding to the current coding block, the target filtering model can be selected from the K groups of filtering models with reference to coding quality and content of the coding block, and then, the reconstructed block is filtered based on the target filtering model, to reduce encoding distortion and improve filtering performance. In addition, for coding blocks with different coding quality and different content in a same image, the filtering performance can be improved on the basis of simplifying a network model, and filtering effect of the coding blocks with different quality and different content in the same image can be met.

Figure 6:
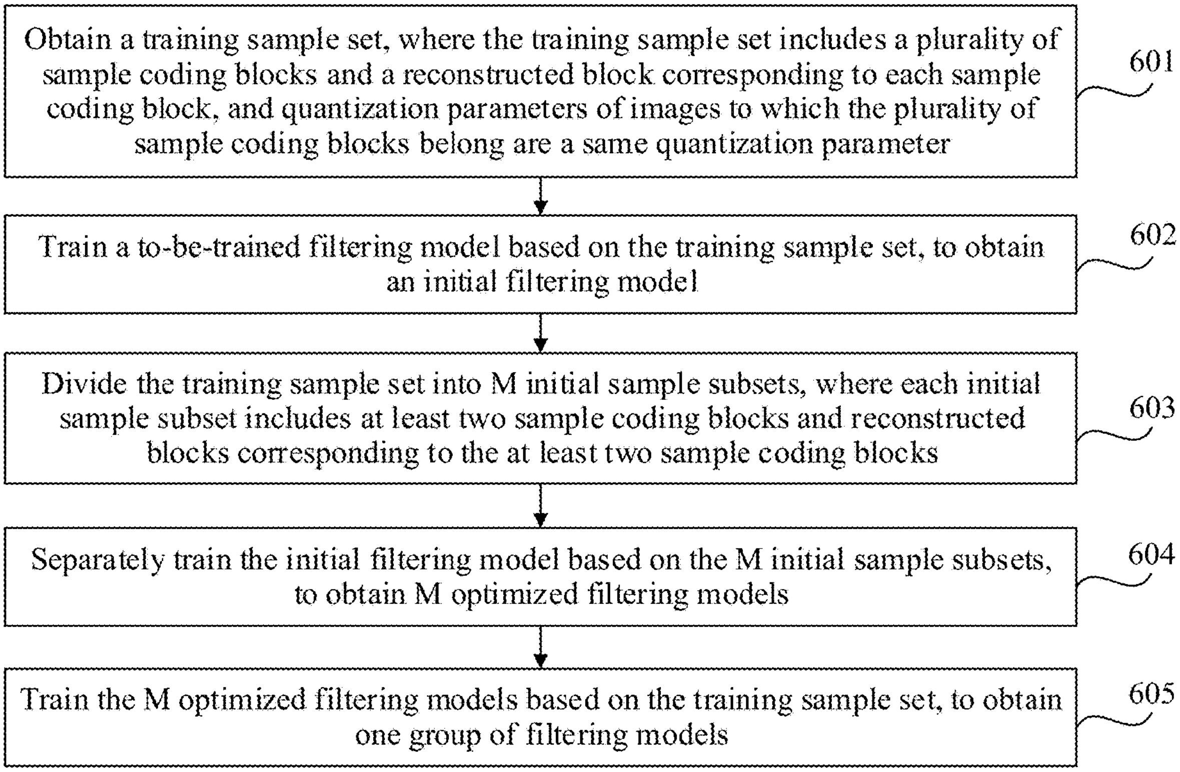
FIG. 6 is a flowchart of a filtering model training method according to an embodiment of this application.

Before the encoder side and the decoder side filter the reconstructed block based on related content in the foregoing operations, an untrained filtering model further needs to be trained, to obtain a group of filtering models corresponding to one quantization parameter. The group of filtering models includes M filtering models. FIG. 6 is a flowchart of a filtering model training method according to an embodiment of this application. Refer to FIG. 6. The method includes the following operations.

Operation 601: Obtain a training sample set, where the training sample set includes a plurality of sample coding blocks and a reconstructed block corresponding to each sample coding block, and quantization parameters of one or more images to which the plurality of sample coding blocks belong are a same quantization parameter.

The plurality of sample coding blocks are obtained by dividing a plurality of sample images, or the plurality of sample coding blocks are obtained by dividing one sample image. In other words, the plurality of sample coding blocks may be from a same sample image, or may be from different sample images, provided that the quantization parameters of the one or more images to which the plurality of sample coding blocks belong are the same. Because the plurality of sample coding blocks are obtained by dividing the image into a plurality of non-overlapping coding blocks, content of the plurality of sample coding blocks is different.

For a process of obtaining the reconstructed block corresponding to each sample coding block, refer to related descriptions of determining, by the encoder side, the reconstructed block corresponding to the current coding block in FIG. 2. Details are not described herein again.

Operation 602: Train a to-be-trained filtering model based on the training sample set, to obtain an initial filtering model.

Reconstructed blocks corresponding to the plurality of sample coding blocks included in the training sample set are used as an input of the to-be-trained filtering model, the plurality of sample coding blocks are used as an output of the to-be-trained filtering model, and the to-be-trained filtering model is trained, to obtain the initial filtering model.

Operation 603: Divide the training sample set into M initial sample subsets, where each initial sample subset includes at least two sample coding blocks and reconstructed blocks corresponding to the at least two sample coding blocks.

The reconstructed blocks corresponding to the plurality of sample coding blocks are input into the initial filtering model, to obtain a filter block corresponding to each sample coding block, a peak signal to noise ratio of the filter block corresponding to each sample coding block is determined based on the plurality of sample coding blocks and the filter block corresponding to each sample coding block, the plurality of sample coding blocks are ranked in an order of peak signal to noise ratios, and the training sample set is divided into the M initial sample subsets based on a ranking result, where sample coding blocks included in each initial sample subset are at least two consecutive sample coding blocks in the ranking result.

For any one of the plurality of sample coding blocks, a peak signal to noise ratio of a filter block corresponding to the sample coding block is determined according to Formula (2):

$$PSNR = 10 \times \log_{10}\left(\frac{(2^n - 1)^2}{MSE}\right) \tag{2}$$

In Formula (2), PSNR indicates the peak signal to noise ratio of the filter block corresponding to the sample coding block, n indicates a quantity of bits required for encoding each pixel in the sample coding block and is usually 8, and MSE indicates a mean squared error between a pixel value of a pixel in the sample coding block and a pixel value of a pixel in the corresponding filter block.

For example, the training sample set is evenly divided into the M initial sample subsets based on the ranking result of the plurality of sample coding blocks, and each initial sample subset includes a same quantity of sample coding blocks. Certainly, in actual application, after the plurality of sample coding blocks are ranked in the order of peak signal to noise ratios, the training sample set can be further divided into the M initial sample subsets according to another standard. This is not limited in embodiments of this application.

For example, the training sample set includes 16 sample coding blocks and a reconstructed block corresponding to each sample coding block. It is assumed that the 16 sample coding blocks are B0 to B15, and reconstructed blocks corresponding to the 16 sample coding blocks are C0 to C15. The 16 reconstructed blocks C0 to C15 are separately input to the initial filtering model, to 16 filter blocks L0 to L15. Then, peak signal to noise ratios of L0 to L15, are determined according to Formula (2), to obtain 16 obtained peak signal to noise ratios PSNR0 to PSNR15. Then, B0 to B15 are ranked in an order of values of PSNR0 to PSNR15, and B0 to B15 are evenly classified into four initial sample subsets based on a ranking result of B0 to B15, where each initial sample subset includes four sample coding blocks.

It should be noted that, that the plurality of sample coding blocks are ranked in the order of peak signal to noise ratios, to further divide the training sample set into the M initial sample subsets is an example. In some other embodiments, the training sample set can alternatively be divided into the M initial sample subsets in another manner. For example, an average pixel value corresponding to each sample coding block is determined, where the average pixel value is an average value of pixel values of pixels in the sample coding block. Then, the plurality of sample coding blocks are ranked in an order of average pixel values, and the training sample set is divided into the M initial sample subsets based on a ranking result. For another example, a pixel variance corresponding to each sample coding block is determined, where the pixel variance is a variance of pixel values of pixels in the sample coding block. Then, the plurality of sample coding blocks are ranked in an order of pixel variances, and the training sample set is divided into the M initial sample subsets based on a ranking result.

Operation 604: Separately train the initial filtering model based on the M initial sample subsets, to obtain M optimized filtering models.

For any one of the M initial sample subsets, the reconstructed blocks corresponding to the at least two sample coding blocks included in the initial sample subset are used as an input of the initial filtering model, and the at least two sample coding blocks are used as an output of the initial filtering model, to train the initial filtering model, so as to obtain an optimized filtering model. In this way, the initial filtering model can be trained based on each of the M initial sample subsets by performing the foregoing operations, to obtain the M optimized filtering models.

Based on the foregoing descriptions, it is assumed that the training sample set B0 to B15 is evenly classified into four initial sample subsets. In this case, the initial filtering model is separately trained based on the four initial sample subsets, to obtain four optimized filtering models: a filtering model A, a filtering model B, a filtering model C, and a filtering model D.

Operation 605: Train the M optimized filtering models based on the training sample set, to obtain one group of filtering models.

The M optimized filtering models are trained based on the training sample set in a cyclic iteration manner. The $i^{th}$ iteration processing in the cyclic iteration manner includes the following operations.

(1) Divide the training sample set into M optimized sample subsets based on the plurality of sample coding blocks and the reconstructed block corresponding to each sample coding block, where the M optimized sample subsets one-to-one correspond to M filtering models in the $i^{th}$ iteration processing, and M filtering models in the $1^{st}$ iteration processing are the M optimized filtering models.

Reconstructed blocks corresponding to the plurality of sample coding blocks are input into the M filtering models in the $i^{th}$ iteration processing, to obtain M filter blocks corresponding to each sample coding block; peak signal to noise ratios of the M filter blocks corresponding to each sample coding block are determined based on the plurality of sample coding blocks and the M filter blocks corresponding to each sample coding block; and the training sample set is divided into the M optimized sample subsets based on the peak signal to noise ratios of the M filter blocks corresponding to each sample coding block, where each sample coding block is located in an optimized sample subset of a filtering model corresponding to a filter block with a largest peak signal to noise ratio in the M filter blocks corresponding to the sample coding block.

For a process of determining the peak signal to noise ratios of the M filter blocks corresponding to each sample coding block, refer to related descriptions of determining the peak signal to noise ratio according to Formula (2) in operation 603. Details are not described herein again. For any one of the plurality of sample coding blocks, a filtering model corresponding to a largest peak signal to noise ratio in peak signal to noise ratios of M filter blocks corresponding to the sample coding block is determined, and then, the sample coding block is allocated into an optimized sample subset corresponding to the filtering model.

Based on the foregoing descriptions, the training sample set includes 16 sample coding blocks and the reconstructed block corresponding to each sample coding block. It is assumed that reconstructed blocks corresponding to the 16 sample coding blocks are C0 to C15. The reconstructed block C0 in the 16 reconstructed blocks is used as an example. The reconstructed block C0 is separately input into four filtering models in the $i^{th}$ iteration processing, and four filter blocks that corresponds to the sample coding block B0 and that are output by the four filtering models are $L0_A$, $L0_B$, $L0_C$, and $L0_D$. It is assumed that, according to Formula (2), it is determined that four peak signal to noise ratios corresponding to the sample coding block B0 are $PSNR0_A$, $PSNR0_B$, $PSNR0_C$, and $PSNR0_D$. If the peak signal to noise ratio $PSNR0_C$ is the largest, the sample coding block B0 is allocated into an optimized sample subset corresponding to the filtering model C.

(2) Train the M filtering models in the $i^{th}$ iteration processing based on the M optimized sample subsets.

For any one of the M optimized sample subsets, a reconstructed block corresponding to a sample coding block included in the optimized sample subset is used as an input of a corresponding filtering model, and the sample coding block is used as an output of the corresponding filtering model, to train the corresponding filtering model.

(3) If i is less than an iteration quantity threshold, use M filtering models, obtained through training, in the $i^{th}$ iteration processing as M filtering models in the $(i+1)^{th}$ iteration processing, and perform the $(i+1)^{th}$ iteration processing.

(4) If i is greater than or equal to an iteration quantity threshold, determine M filtering models, obtained through training, in the $i^{th}$ iteration processing as one group of filtering models.

In this embodiment of this application, the M optimized filtering models are trained in the cyclic iteration manner. When an iteration quantity i of the M filtering models is less than the iteration quantity threshold, it indicates that the optimized filtering model obtained through current training is unreliable. In this case, the M filtering models, obtained through training, in the $i^{th}$ iteration processing are used as the M filtering models in the $(i+1)^{th}$ iteration processing, and the $(i+1)^{th}$ iteration processing continues to be performed. When the iteration quantity i of the M filtering models is greater than or equal to the iteration quantity threshold, it indicates that the optimized filtering model obtained through current training is reliable. In this case, the iteration processing is stopped, and the M filtering models, obtained through training, in the $i^{th}$ iteration processing are used as the one group of filtering models.

The iteration quantity threshold is preset. The iteration quantity threshold is a specified iteration quantity or a largest iteration quantity, and can be set based on different requirements. This is not limited in embodiments of this application.

It should be noted that, in a process of dividing the training sample set into the M optimized sample subsets based on the peak signal to noise ratios of the M filter blocks corresponding to each sample coding block, the training sample set may be divided into only one optimized sample subset. In other words, the largest peak signal to noise ratio in the peak signal to noise ratios of the M filter blocks corresponding to each sample coding block in the training sample set corresponds to a same filtering model. In this case, based on the one optimized sample subset obtained through division, the filtering model in the $i^{th}$ iteration processing is trained, and iteration processing on another filtering model is stopped.

In this embodiment of this application, because the quantization parameters of the one or more images to which the plurality of sample coding blocks included in the training sample set belong are a same quantization parameter, an untrained filtering model is trained based on the training sample set, and the one group of filtering models obtained through training is applicable to coding blocks with same coding quality. In addition, because the content of the plurality of sample coding blocks included in the training sample set is different, the M filtering models included in the group of filtering models are applicable to coding blocks with different content. In this way, after the K groups of filtering models are determined based on the quantization parameter of the target image, for the reconstructed block corresponding to the current coding block, the target filtering model can be selected from the K groups of filtering models with reference to coding quality and content of the coding block, and then, the reconstructed block is filtered based on the target filtering model, to reduce encoding distortion and improve filtering performance. In addition, for coding blocks with different coding quality and different content in a same image, the filtering performance can be improved on the basis of simplifying a network model, and filtering effect of the coding blocks with different quality and different content in the same image can be met.

Figure 7:
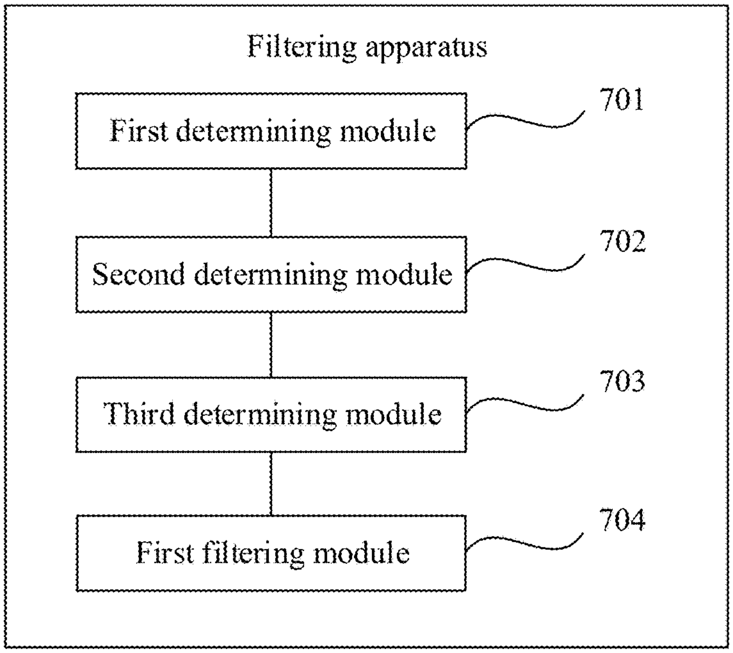
FIG. 7 is a diagram of a structure of a filtering apparatus according to an embodiment of this application.

FIG. 7 is a diagram of a structure of a filtering apparatus according to an embodiment of this application. The filtering apparatus may be implemented as a part or an entirety of an encoder side device by using software, hardware, or a combination thereof. The encoder side device may be the source apparatus shown in FIG. 1. As shown in FIG. 7, the apparatus includes a first determining module 701, a second determining module 702, a third determining module 703, and a first filtering module 704.

The first determining module 701 is configured to determine K groups of filtering models based on a quantization parameter of a target image, where each group of the K groups of filtering models includes M filtering models, a same group of filtering models corresponds to a same quantization parameter, different groups of filtering models correspond to different quantization parameters, and both K and M are integers greater than 1. For a detailed implementation process, refer to corresponding content in the foregoing embodiments. Details are not described herein again.

The second determining module 702 is configured to determine a reconstructed block corresponding to a current coding block in the target image. For a detailed implementation process, refer to corresponding content in the foregoing embodiments. Details are not described herein again.

The third determining module 703 is configured to determine a target filtering model from the K groups of filtering models, where the target filtering model is a filtering model corresponding to smallest encoding distortion existing after the reconstructed block is filtered, and the encoding distortion existing after the reconstructed block is filtered based on the target filtering model is less than encoding distortion of the reconstructed block. For a detailed implementation process, refer to corresponding content in the foregoing embodiments. Details are not described herein again.

The first filtering module 704 is configured to filter the reconstructed block based on the target filtering model. For a detailed implementation process, refer to corresponding content in the foregoing embodiments. Details are not described herein again.

In an embodiment, the third determining module 703 includes:

- a first determining unit, configured to determine, based on the current coding block, the reconstructed block, and the K groups of filtering models, filtering indication information corresponding to the reconstructed block, where the filtering indication information indicates whether the reconstructed block needs to be filtered; and a second determining unit, configured to: when the filtering indication information indicates that the reconstructed block needs to be filtered, determine the target filtering model from the K groups of filtering models.

In an embodiment, the first determining unit is configured to:

input the reconstructed block into each of the K groups of filtering models, to obtain K*M filter blocks;

determine, based on the current coding block, the reconstructed block, and the K*M filter blocks, a rate-distortion cost corresponding to the reconstructed block and a rate-distortion cost corresponding to each filter block; and if the rate-distortion cost corresponding to the reconstructed block is not less than the rate-distortion cost corresponding to each filter block, determine that the filtering indication information is first indication information, where the first indication information indicates that the reconstructed block needs to be filtered; or if the rate-distortion cost corresponding to the reconstructed block is less than the rate-distortion cost corresponding to each filter block, determine that the filtering indication information is second indication information, where the second indication information indicates that the reconstructed block does not need to be filtered.

In an embodiment, the apparatus further includes:

a second filtering module, configured to: when the filtering indication information indicates that the reconstructed block does not need to be filtered, skip filtering the reconstructed block.

In an embodiment, the third determining module 703 further includes:

an encoding unit, configured to encode the filtering indication information into a bitstream.

In an embodiment, the apparatus further includes:

a first encoding module, configured to encode a target index into the bitstream, where the target index indicates the target filtering model.

In an embodiment, the apparatus further includes:

a second encoding module, configured to encode quantization parameters corresponding to the K groups of filtering models into the bitstream.

In this embodiment of this application, each group of filtering models includes the M filtering models, a same group of filtering models corresponds to a same quantization parameter, and different groups of filtering models correspond to different quantization parameters. That is, a same group of filtering models is applicable to coding blocks with same coding quality, different groups of filtering models are applicable to coding blocks with different coding quality, and different filtering models in a same group of filtering models are applicable to coding blocks with different content. In this way, after the K groups of filtering models are determined based on the quantization parameter of the target image, for the reconstructed block corresponding to the current coding block, the target filtering model can be selected from the K groups of filtering models with reference to coding quality and content of the coding block, and then, the reconstructed block is filtered based on the target filtering model, to reduce encoding distortion and improve filtering performance. In addition, for coding blocks with different coding quality and different content in a same image, the filtering performance can be improved on the basis of simplifying a network model, and filtering effect of the coding blocks with different quality and different content in the same image can be met.

It should be noted that, during filtering by the filtering apparatus provided in the foregoing embodiment, division into the foregoing functional modules is merely used as an example for description. In actual application, the foregoing functions may be allocated to different functional modules and implemented based on a requirement. To be specific, an internal structure of the apparatus is divided into different functional modules to implement all or some of the functions described above. In addition, the filtering apparatus provided in the foregoing embodiment and the filtering method embodiment belong to a same concept. For a specific implementation process of the filtering apparatus, refer to the method embodiment for details. Details are not described herein again.

Figure 8:
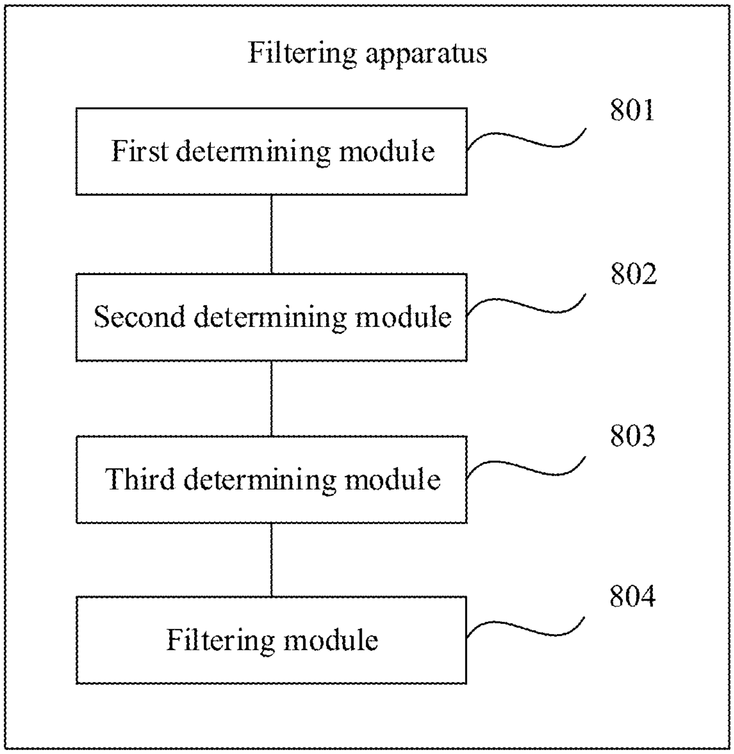
FIG. 8 is a diagram of a structure of another filtering apparatus according to an embodiment of this application.

FIG. 8 is a diagram of a structure of another filtering apparatus according to an embodiment of this application. The filtering apparatus may be implemented as a part or an entirety of a decoder side device by using software, hardware, or a combination thereof. The decoder side device may be the destination apparatus shown in FIG. 1. As shown in FIG. 8, the apparatus includes a first determining module 801, a second determining module 802, a third determining module 803, and a filtering module 804.

The first determining module 801 is configured to determine K groups of filtering models, where each group of the K groups of filtering models includes M filtering models, a same group of filtering models corresponds to a same quantization parameter, different groups of filtering models correspond to different quantization parameters, and both K and M are integers greater than 1. For a detailed implementation process, refer to corresponding content in the foregoing embodiments. Details are not described herein again.

The second determining module 802 is configured to determine a reconstructed block based on a bitstream. For a detailed implementation process, refer to corresponding content in the foregoing embodiments. Details are not described herein again.

The third determining module 803 is configured to determine a target filtering model from the K groups of filtering models. For a detailed implementation process, refer to corresponding content in the foregoing embodiments. Details are not described herein again.

The filtering module 804 is configured to filter the reconstructed block based on the target filtering model. For a detailed implementation process, refer to corresponding content in the foregoing embodiments. Details are not described herein again.

In an embodiment, the first determining module 801 is configured to:

determine the K groups of filtering models based on a quantization parameter of a target image to which the reconstructed block belongs.

In an embodiment, the first determining module 801 is configured to:

parse out, from the bitstream, quantization parameters corresponding to the K groups of filtering models; and determine the K groups of filtering models based on the quantization parameters corresponding to the K groups of filtering models.

In an embodiment, the third determining module 803 includes:

a first determining unit, configured to determine filtering indication information of the reconstructed block, where the filtering indication information indicates whether the reconstructed block needs to be filtered; and a second determining unit, configured to: when the filtering indication information indicates that the reconstructed block needs to be filtered, determine the target filtering model from the K groups of filtering models.

In an embodiment, the first determining unit is configured to:

parse out the filtering indication information from the bitstream.

In an embodiment, the third determining module 803 is configured to:

parse out a target index from the bitstream, where the target index indicates the target filtering model; and determine the target filtering model based on the target index.

In this embodiment of this application, each group of filtering models includes the M filtering models, a same group of filtering models corresponds to a same quantization parameter, and different groups of filtering models correspond to different quantization parameters. That is, a same group of filtering models is applicable to coding blocks with same coding quality, different groups of filtering models are applicable to coding blocks with different coding quality, and different filtering models in a same group of filtering models are applicable to coding blocks with different content. In this way, after the K groups of filtering models are determined based on the quantization parameter of the target image, for the reconstructed block corresponding to the current coding block, the target filtering model can be selected from the K groups of filtering models with reference to coding quality and content of the coding block, and then, the reconstructed block is filtered based on the target filtering model, to reduce encoding distortion and improve filtering performance. In addition, for coding blocks with different coding quality and different content in a same image, the filtering performance can be improved on the basis of simplifying a network model, and filtering effect of the coding blocks with different quality and different content in the same image can be met.

It should be noted that, during filtering by the filtering apparatus provided in the foregoing embodiment, division into the foregoing functional modules is merely used as an example for description. In actual application, the foregoing functions may be allocated to different functional modules and implemented based on a requirement. To be specific, an internal structure of the apparatus is divided into different functional modules to implement all or some of the functions described above. In addition, the filtering apparatus provided in the foregoing embodiment and the filtering method embodiment belong to a same concept. For a specific implementation process of the filtering apparatus, refer to the method embodiment for details. Details are not described herein again.

Figure 9:
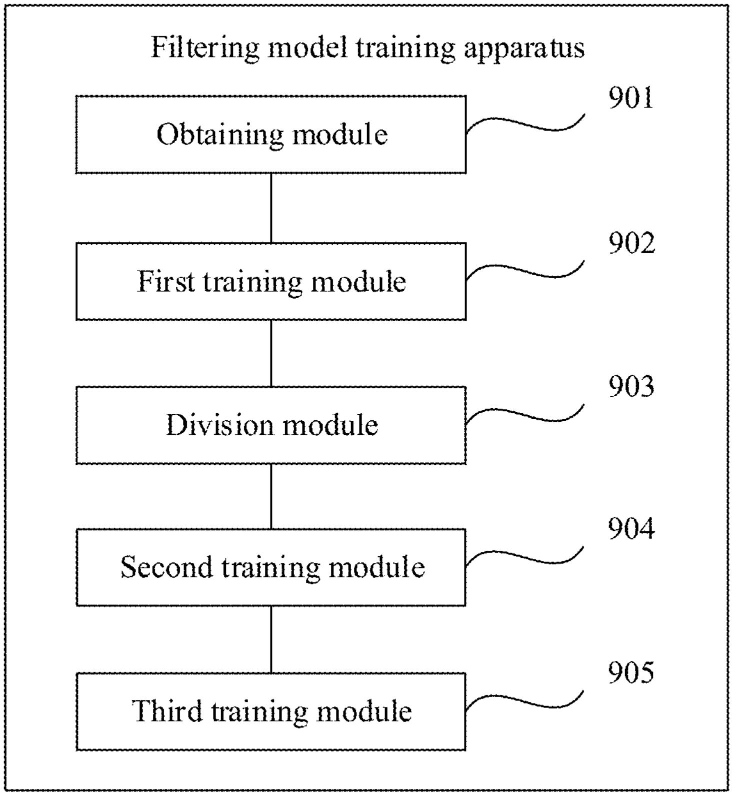
FIG. 9 is a diagram of a structure of a filtering model training apparatus according to an embodiment of this application.

FIG. 9 is a diagram of a structure of a filtering model training apparatus according to an embodiment of this application. The filtering model training apparatus may be implemented as a part or an entirety of a filtering model training device by using software, hardware, or a combination thereof. As shown in FIG. 9, the apparatus includes an obtaining module 901, a first training module 902, a division module 903, a second training module 904, and a third training module 905.

The obtaining module 901 is configured to obtain a training sample set, where the training sample set includes a plurality of sample coding blocks and a reconstructed block corresponding to each sample coding block, and quantization parameters of one or more images to which the plurality of sample coding blocks belong are a same quantization parameter. For a detailed implementation process, refer to corresponding content in the foregoing embodiments. Details are not described herein again.

The first training module 902 is configured to train a to-be-trained filtering model based on the training sample set, to obtain an initial filtering model. For a detailed implementation process, refer to corresponding content in the foregoing embodiments. Details are not described herein again.

The division module 903 is configured to divide the training sample set into M initial sample subsets, where each initial sample subset includes at least two sample coding blocks and reconstructed blocks corresponding to the at least two sample coding blocks. For a detailed implementation process, refer to corresponding content in the foregoing embodiments. Details are not described herein again.

The second training module 904 is configured to separately train the initial filtering model based on the M initial sample subsets, to obtain M optimized filtering models. For a detailed implementation process, refer to corresponding content in the foregoing embodiments. Details are not described herein again.

The third training module 905 is configured to train the M optimized filtering models based on the training sample set, to obtain one group of filtering models. For a detailed implementation process, refer to corresponding content in the foregoing embodiments. Details are not described herein again.

In an embodiment, the division module 903 is configured to:

input reconstructed blocks corresponding to the plurality of sample coding blocks into the initial filtering model, to obtain a filter block corresponding to each sample coding block;

determine, based on the plurality of sample coding blocks and the filter block corresponding to each sample coding block, a peak signal to noise ratio of the filter block corresponding to each sample coding block;

rank the plurality of sample coding blocks in an order of peak signal to noise ratios; and divide the training sample set into the M initial sample subsets based on a ranking result, where sample coding blocks included in each initial sample subset are at least two consecutive sample coding blocks in the ranking result.

In an embodiment, the third training module 905 is configured to:

train the M optimized filtering models based on the training sample set in a cyclic iteration manner, where $i^{th}$ iteration processing in the cyclic iteration manner includes the following operations:

dividing the training sample set into M optimized sample subsets based on the plurality of sample coding blocks and the reconstructed block corresponding to each sample coding block, where the M optimized sample subsets one-to-one correspond to M filtering models in the $i^{th}$ iteration processing, and M filtering models in the $1^{st}$ iteration processing are the M optimized filtering models;

training the M filtering models in the $i^{th}$ iteration processing based on the M optimized sample subsets; and if i is less than an iteration quantity threshold, using M filtering models, obtained through training, in the $i^{th}$ iteration processing as M filtering models in $(i+1)^{th}$ iteration processing, and performing the $(i+1)^{th}$ iteration processing; or if i is greater than or equal to an iteration quantity threshold, determining M filtering models, obtained through training, in the $i^{th}$ iteration processing as the one group of filtering models.

In an embodiment, the third training module 905 is configured to:

input the reconstructed blocks corresponding to the plurality of sample coding blocks into the M filtering models in the $i^{th}$ iteration processing, to obtain M filter blocks corresponding to each sample coding block;

determine, based on the plurality of sample coding blocks and the M filter blocks corresponding to each sample coding block, peak signal to noise ratios of the M filter blocks corresponding to each sample coding block; and divide the training sample set into the M optimized sample subsets based on the peak signal to noise ratios of the M filter blocks corresponding to each sample coding block, where each sample coding block is located in an optimized sample subset of a filtering model corresponding to a filter block with a largest peak signal to noise ratio in the M filter blocks corresponding to the sample coding block.

In this embodiment of this application, because the quantization parameters of the one or more images to which the plurality of sample coding blocks included in the training sample set belong are a same quantization parameter, an untrained filtering model is trained based on the training sample set, and the one group of filtering models obtained through training is applicable to coding blocks with same coding quality. In addition, because the content of the plurality of sample coding blocks included in the training sample set is different, the M filtering models included in the group of filtering models are applicable to coding blocks with different content. In this way, after the K groups of filtering models are determined based on the quantization parameter of the target image, for the reconstructed block corresponding to the current coding block, the target filtering model can be selected from the K groups of filtering models with reference to coding quality and content of the coding block, and then, the reconstructed block is filtered based on the target filtering model, to reduce encoding distortion and improve filtering performance. In addition, for coding blocks with different coding quality and different content in a same image, the filtering performance can be improved on the basis of simplifying a network model, and filtering effect of the coding blocks with different quality and different content in the same image can be met.

It should be noted that, during filtering model training performed by the filtering model training apparatus provided in the foregoing embodiment, division into the foregoing functional modules is merely used as an example for description. In actual application, the foregoing functions may be allocated to different functional modules and implemented based on a requirement. To be specific, an internal structure of the apparatus is divided into different functional modules to implement all or some of the functions described above. In addition, the filtering model training apparatus provided in the foregoing embodiment and the filtering model training method embodiment belong to a same concept. For a specific implementation process of the filtering model training apparatus, refer to the method embodiment for details. Details are not described herein again.

Figure 10:
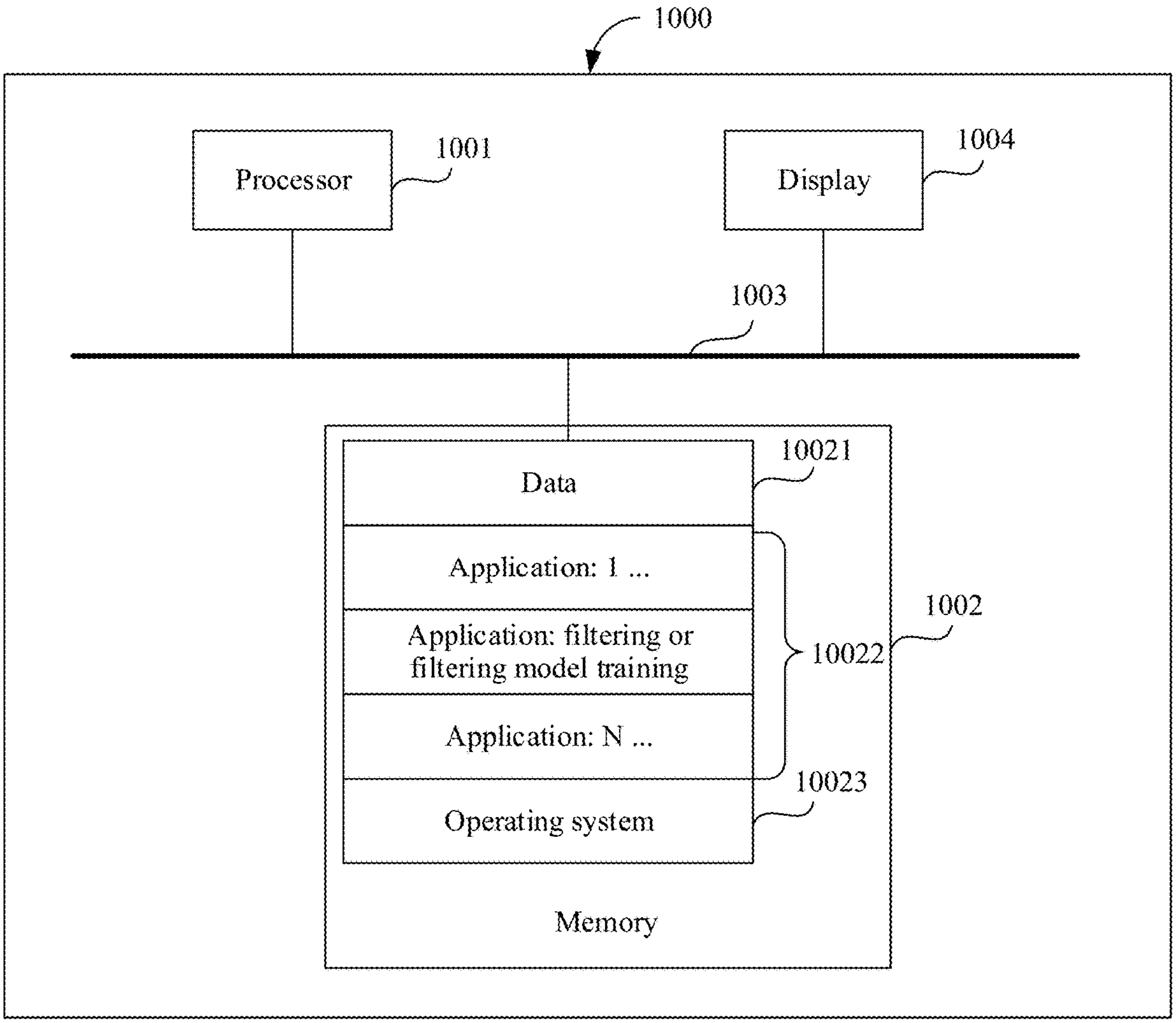
FIG. 10 is a diagram of a structure of a computer device according to an embodiment of this application.

FIG. 10 is a block diagram of a computer device 1000 according to an embodiment of this application. The computer device 1000 may include a processor 1001, a memory 1002, and a bus system 1003. The processor 1001 and the memory 1002 are connected through the bus system 1003. The memory 1002 is configured to store instructions. The processor 1001 is configured to execute the instructions stored in the memory 1002, to perform the filtering method and the filtering model training method described in embodiments of this application. To avoid repetition, details are not described herein again.

In this embodiment of this application, the processor 1001 may be a central processing unit (CPU), or the processor 1001 may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

The memory 1002 may include a ROM device or a RAM device. Any other appropriate type of storage device may also serve as the memory 1002. The memory 1002 may include code and data 10021 accessed by the processor 1001 through the bus 1003. The memory 1002 may further include an operating system 10023 and an application 10022. The application 10022 includes at least one program that enables the processor 1001 to perform the filtering method or the filtering model training method described in embodiments of this application. For example, the application 10022 may include applications 1 to N, and further include an application for performing the filtering method or the filtering model training method described in embodiments of this application.

The bus system 1003 may further include a power bus, a control bus, a status signal bus, and the like, in addition to a data bus. However, for clear description, various types of buses in the figure are marked as the bus system 1003.

In an embodiment, the computer device 1000 may further include one or more output devices, for example, a display 1004. In an example, the display 1004 may be a touch-sensitive display that combines a display with a touch-sensitive unit that is operable to sense a touch input. The display 1004 may be connected to the processor 1001 through the bus 1003.

It should be noted that the computer device 1000 may perform the filtering method in embodiments of this application, or may perform the filtering model training method in embodiments of this application.

A person skilled in the art can appreciate that functions described with reference to various illustrative logical blocks, modules, and algorithm operations disclosed and described herein may be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another place (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or by using a wireless technology like infrared, radio, or microwave, the coaxial cable, the optical fiber, the twisted pair, the DSL, or the wireless technology like infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a DVD, and a Blu-ray disc. The disks usually reproduce data magnetically, and the discs reproduce data optically through lasers. Combinations of the above should also be included within the scope of the computer-readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements. In an example, various illustrative logic blocks, units, and modules in an encoder and a decoder may be understood as corresponding circuit devices or logic elements.

Technologies in embodiments of this application may be implemented in various apparatuses or devices, including a wireless handset, an integrated circuit (IC), or a set of ICs (for example, a chip set). Various components, modules, or units are described in embodiments of this application to emphasize functional aspects of apparatuses configured to perform disclosed technologies, but do not necessarily need to be implemented by different hardware units. Actually, as described above, various units may be combined with appropriate software and/or firmware into a codec hardware unit, or provided by an interoperable hardware unit (including the one or more processors described above).

In other words, all or some of the foregoing embodiments may be implemented by using software, hardware, firmware, or any combination thereof. When software is used to implement embodiments, all or some of embodiments may be implemented in a form of computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a digital versatile disc (DVD)), a semiconductor medium (for example, a solid-state disk (SSD)), or the like. It should be noted that the computer-readable storage medium mentioned in embodiments of this application may be a non-volatile storage medium, that is, may be a non-transitory storage medium.

In some embodiments, an encoder side device is provided. The encoder side device includes a memory and a processor.

The memory is configured to store a computer program, and the processor is configured to execute the computer program stored in the memory, to implement the filtering method.

In some embodiments, a decoder side device is provided. The decoder side device includes a memory and a processor.

The memory is configured to store a computer program, and the processor is configured to execute the computer program stored in the memory, to implement the filtering method.

In some embodiments, a filtering model training device is provided. The filtering model training device includes a memory and a processor.

The memory is configured to store a computer program, and the processor is configured to execute the computer program stored in the memory, to implement the filtering model training method.

In some embodiments, a computer-readable storage medium is provided. The storage medium stores instructions. When the instructions are run on a computer, the computer is enabled to perform operations of the foregoing method.

In some embodiments, a computer program is provided. When the computer program is executed, the foregoing method is implemented.

It should be understood that "a plurality of" in this specification means two or more. In descriptions of embodiments of this application, unless otherwise specified, "/" means "or". For example, A/B may indicate A or B. In this specification, "and/or" describes only an association relationship between associated objects and indicates that three relationships may exist. For example, A and/or B may indicate the following three cases: Only A exists, both A and B exist, and only B exists. In addition, to clearly describe technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that information (including but not limited to user equipment information, personal information of a user, and the like), data (including but not limited to data used for analysis, stored data, displayed data, and the like), and signals in embodiments of this application are used under authorization by the user or full authorization by all parties, and capturing, use, and processing of related data need to conform to related laws, regulations, and standards of related countries and regions. For example, the quantization parameter, the filtering model, the current coding block, and the reconstructed block in embodiments of this application are all obtained under full authorization.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A filtering method for an encoder, comprising:

determining K groups of filtering models based on a quantization parameter of a target image, wherein each group of the K groups of filtering models comprises M filtering models, a same group of filtering models corresponds to a same quantization parameter, different groups of filtering models correspond to different quantization parameters, and K and M are integers greater than 1;

determining a reconstructed block corresponding to a current coding block in the target image;

determining a target filtering model from the K groups of filtering models; and filtering the reconstructed block based on the target filtering model;

wherein the target filtering model is a filtering model corresponding to a smallest encoding distortion existing after the reconstructed block is filtered, and the reconstructed block is filtered based on the target filtering model being less than an encoding distortion of the reconstructed block.

2. The filtering method according to claim 1, wherein determining the target filtering model from the K groups of filtering models comprises:

determining filtering indication information corresponding to the reconstructed block based on the current coding block, the reconstructed block, and the K groups of filtering models, wherein the filtering indication information indicates whether the reconstructed block needs to be filtered; and when the filtering indication information indicates that the reconstructed block needs to be filtered, determining the target filtering model from the K groups of filtering models.

3. The filtering method according to claim 2, wherein determining the filtering indication information corresponding to the reconstructed block comprises:

inputting the reconstructed block into each group of the K groups of filtering models, to obtain K*M filter blocks;

determining a rate-distortion cost corresponding to the reconstructed block and a rate-distortion cost corresponding to each filter block of the K*M filter blocks based on the current coding block, the reconstructed block, and the K*M filter blocks; and in response to determining that the rate-distortion cost corresponding to the reconstructed block is not less than the rate-distortion cost corresponding to each filter block, determining that the filtering indication information is first indication information indicating that the reconstructed block needs to be filtered; or in response to determining that the rate-distortion cost corresponding to the reconstructed block is less than the rate-distortion cost corresponding to each filter block, determining that the filtering indication information is second indication information indicating that the reconstructed block does not need to be filtered.

4. The filtering method according to claim 2, wherein the method further comprises:

when the filtering indication information indicates that the reconstructed block does not need to be filtered, skipping filtering the reconstructed block.

5. The filtering method according to claim 2, wherein after determining the filtering indication information corresponding to the reconstructed block, the method further comprises:

encoding the filtering indication information into a bitstream.

6. The filtering method according to claim 1, wherein after determining the target filtering model from the K groups of filtering models, the method further comprises:

encoding a target index into a bitstream, wherein the target index indicates the target filtering model.

7. The filtering method according to claim 1, wherein after determining the K groups of filtering models, the method further comprises:

encoding quantization parameters corresponding to the K groups of filtering models into a bitstream.

8. A filtering method for a decoder, comprising:

determining K groups of filtering models, wherein each group of the K groups of filtering models comprises M filtering models, a same group of filtering models corresponds to a same quantization parameter, different groups of filtering models correspond to different quantization parameters, and K and M are integers greater than 1;

determining a reconstructed block based on a bitstream;

determining a target filtering model from the K groups of filtering models; and filtering the reconstructed block based on the target filtering model.

9. The filtering method according to claim 8, wherein determining the K groups of filtering models comprises:

determining the K groups of filtering models based on a quantization parameter of a target image to which the reconstructed block belongs.

10. The filtering method according to claim 8, wherein determining the K groups of filtering models comprises:

parsing out, from the bitstream, quantization parameters corresponding to the K groups of filtering models; and determining the K groups of filtering models based on the quantization parameters corresponding to the K groups of filtering models.

11. The filtering method according to claim 8, wherein determining the target filtering model from the K groups of filtering models comprises:

determining filtering indication information of the reconstructed block, wherein the filtering indication information indicates whether the reconstructed block needs to be filtered; and when the filtering indication information indicates that the reconstructed block needs to be filtered, determining the target filtering model from the K groups of filtering models.

12. The filtering method according to claim 11, wherein determining the filtering indication information of the reconstructed block comprises:

parsing out the filtering indication information from the bitstream.

13. The filtering method according to claim 8, wherein determining the target filtering model from the K groups of filtering models comprises:

parsing out a target index from the bitstream, wherein the target index indicates the target filtering model; and determining the target filtering model based on the target index.

14. A filtering apparatus for a decoder, comprising:

one or more processors; and a memory coupled to the one or more processors to store instructions, which when executed by the one or more processors, cause the filtering apparatus to:

determine K groups of filtering models, wherein each group of the K groups of filtering models comprises M filtering models, a same group of filtering models corresponds to a same quantization parameter, different groups of filtering models correspond to different quantization parameters, and K and M are integers greater than 1;

determine a reconstructed block based on a bitstream;

determine a target filtering model from the K groups of filtering models; and filter the reconstructed block based on the target filtering model.

15. The filtering apparatus according to claim 14, wherein the filtering apparatus to determine the K groups of filtering models comprises the filtering apparatus to:

determine the K groups of filtering models based on a quantization parameter of a target image to which the reconstructed block belongs.

16. The filtering apparatus according to claim 14, wherein the filtering apparatus to determine the K groups of filtering models comprises the filtering apparatus to:

parse out, from the bitstream, quantization parameters corresponding to the K groups of filtering models; and determine the K groups of filtering models based on the quantization parameters corresponding to the K groups of filtering models.

17. The filtering apparatus according to claim 14, wherein the filtering apparatus to determine the target filtering model from the K groups of filtering models comprises the filtering apparatus to:

determine filtering indication information of the reconstructed block, wherein the filtering indication information indicates whether the reconstructed block needs to be filtered; and when the filtering indication information indicates that the reconstructed block needs to be filtered, determine the target filtering model from the K groups of filtering models.

18. The filtering apparatus according to claim 17, wherein the filtering apparatus to determine the filtering indication information of the reconstructed block comprises the filtering apparatus to:

parse out the filtering indication information from the bitstream.

19. The filtering apparatus according to claim 14, wherein the filtering apparatus to determine the target filtering model from the K groups of filtering models comprises the filtering apparatus to:

parse out a target index from the bitstream, wherein the target index indicates the target filtering model; and determine the target filtering model based on the target index.

* * * * *